(12) United States Patent
Sharma et al.

(10) Patent No.: US 10,198,250 B1
(45) Date of Patent: Feb. 5, 2019

(54) PARTITIONING BASED MIGRATION OF SYSTEMS TO CONTAINER AND MICROSERVICE BASED PLATFORMS

(71) Applicant: ACCENTURE GLOBAL SOLUTIONS LIMITED, Dublin (IE)

(72) Inventors: Vibhu Sharma, Bangalore (IN); Sanjay Podder, Thane (IN); Kapil Singi, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 15/862,471

(22) Filed: Jan. 4, 2018

(51) Int. Cl.
  *G06F 8/41* (2018.01)
  *G06F 8/75* (2018.01)
  *G06F 9/445* (2018.01)
  *G06F 17/30* (2006.01)

(52) U.S. Cl.
  CPC .............. *G06F 8/427* (2013.01); *G06F 8/433* (2013.01); *G06F 8/75* (2013.01); *G06F 17/30604* (2013.01)

(58) Field of Classification Search
  None
  See application file for complete search history.

(56) References Cited

U.S. PATENT DOCUMENTS

| 9,158,604 B1* | 10/2015 | Christodorescu | G06F 9/54 |
| 2005/0097533 A1* | 5/2005 | Chakrabarti | G06F 8/433 717/144 |
| 2011/0078211 A1* | 3/2011 | Gass | G06F 8/65 707/803 |
| 2011/0166849 A1* | 7/2011 | Dube | G06Q 10/10 703/23 |
| 2014/0278326 A1* | 9/2014 | Sharma | G06F 8/60 703/13 |
| 2016/0239280 A1* | 8/2016 | Scheiner | G06F 8/60 |

* cited by examiner

*Primary Examiner* — Daxin Wu
(74) *Attorney, Agent, or Firm* — Mannava & Kang, P.C.

(57) ABSTRACT

According to an example, partitioning based migration of systems to container and micro-service based-platforms may include determining, based on an analysis of source code for an application that is to be partitioned, an entity model corresponding to the application, identifying resources associated with the application, and determining a mapping of the identified resources to entities of the entity model. Further, partitioning based migration of systems to container and micro-service based-platforms may include identifying dependencies for each of the mapped resources, generating dependency and control flow metrics for the application, generating affinity values between the mapped resources, generating a resource affinity graph, determining an affinity score between each of the mapped resources, and generating resource clusters that correspond to partitions of the application.

20 Claims, 24 Drawing Sheets

PARTITIONING BASED MIGRATION OF SYSTEMS TO CONTAINER AND MICROSERVICE BASED PLATFORMS

BACKGROUND

An application or a system generally may be designed to operate on a specified platform. For example, an application or a system generally may be designed to operate on a first platform. The first platform may be modified or otherwise changed to a second platform that is different than the first platform. In this regard, the application or the system generally may not correctly operate on the second platform.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
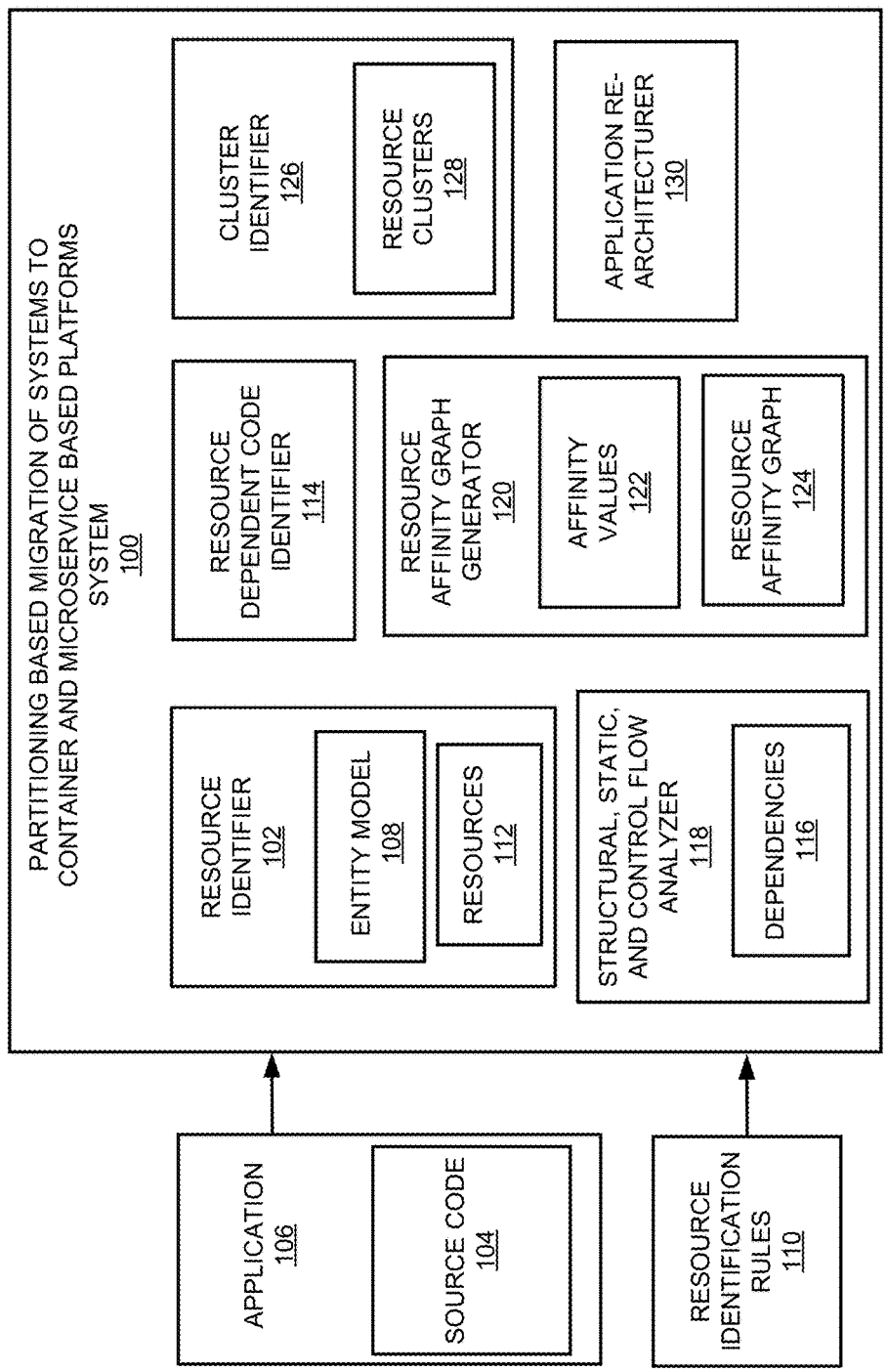
FIG. 1 illustrates an architecture of a partitioning based migration of systems to container and microservice based platforms system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A partitioning based migration of systems (e.g., applications) to container and microservice based platforms system, a method for partitioning based migration of systems to container and micro-service based-platforms, and a non-transitory computer readable medium having stored thereon machine readable instructions for partitioning based migration of systems to container and micro-service based-platforms are disclosed herein. The system, method, and non-transitory computer readable medium disclosed herein provide for analysis of a system, such as an application, to be partitioned, and implementation of a multi-stage analysis to extract different aspects of the system and interaction between modules of the system to determine which modules should remain together, and thus which modules may be separated. Partitioning may be described as the restructuring or breaking down of the existing computer code, for example, for an application, to improve its performance, readability, portability, or code adherence without changing the intended functions of the code. Further, a module may be described as a set of the code that includes the code needed to execute one aspect of a specified functionality of an application, whereas all modules in combination may execute all aspects of the specified functionality of the application.

With respect to partitioning of a system, such as an application, as disclosed herein, migrating existing applications to container and micro-service based platforms is technically challenging in that an application may include multiple aspects such as control flows, data flows, functional cohesiveness, dependencies, etc., which may need to be analyzed before such a refactoring is performed. Control flow may be described as an order in which individual statements, instructions, or function calls of an application are executed or evaluated. Data flow may be described as movement of data through a system (e.g., an application) that may include software and/or hardware. Functional cohesiveness may be described as a measure of strength of a relationship between various modules or functionalities of an application. Code dependency may be described as classes or methods of an application which are dependent on other classes or methods of the application.

Containers and microservices provide for the design and building of applications that are non-monolithic, scalable, portable, include high performance, and may be efficiently maintained. In order to migrate existing (e.g., legacy) applications to such platforms, applications may be partitioned into chunks (e.g., modules) that may be deployed and scaled separately, and further composed together on a platform to realize the functionality of the application. If the partitioning is erroneous, the operation of the application may be adversely impacted. For example, an erroneous partitioning may lead to a relatively significant number of cross-partition calls and unhandled dependencies which may affect the performance, reliability, and maintainability of the partitioned application.

In order to address at least the aforementioned technical challenges with respect to partitioning of an application, the system, method, and non-transitory computer readable medium disclosed herein provide for the generation of pairwise affinity vectors for each module in an application to provide for partitioning of the application. A pairwise affinity vector may represent the quantitative measurement between two modules of an application. The pairwise affinity vector may represent the affinity between the two modules, for example, due to particular aspects such as dependency, etc. Affinity may be directly proportional to the relative magnitude of the dependency between the two modules. For example, a score of 0.2 between module A and module B may indicate less affinity between these modules, versus a score of 0.7 between module A and module C. The pairwise affinity vectors may be used to identify parts of the application that need to remain together after partitioning, thus providing a technical basis to create partitions of the application which may then be packaged into container images or microservices.

According to examples, the system, method, and non-transitory computer readable medium disclosed herein may receive as input an application to be partitioned, along with configuration variables. The configuration variables may be received, for example, from a subject matter expert. The configuration variables may include, for example, the platform the application is to be partitioned for, a number of clusters for the application modules as disclosed herein, etc. As disclosed herein, the system, method, and non-transitory computer readable medium disclosed herein may utilize a multi-stage analysis to extract different aspects of an application and interaction between the application modules, to determine which modules should be kept together. In this regard, the system, method, and non-transitory computer readable medium disclosed herein may utilize a semi-automated technique to determine the modules of the application that may denote packages, cohesive resources, domains, context, or a subject matter expert defined scheme. With respect to packages, a package, such as a Java package, may organize classes, such as Java classes, into namespaces, providing a unique namespace for each type the package contains. With respect to resources, a resource may be described as any abstraction of information in REST. For example, any information that may be named may be a resource such as a document or image, a temporal service (e.g., "today's weather in state XYZ"), a collection of other resources, a non-virtual object (e.g., an animal), etc. A resource may also be described as a conceptual mapping to a set of entities.

With respect to the system, method, and non-transitory computer readable medium disclosed herein, a static analysis of application code may be performed to detect dependencies among the modules of the application. A set of heuristics may be used to create a pair-wise affinity of each pair of modules, which may denote how "affine" the modules of the pair are to each other. In this regard, the greater the number of classes of a particular module that another module is dependent on, the higher the affinity score of the latter module with respect to the first module. A similar vector may be determined based on a static analysis of the control flow among the modules to detect highly interacting (and therefore affine) modules. If dynamic profiling information is available, the dynamic profiling information may be used to further generate another pair-wise affinity vector between modules based on detection of run-time data flow and invocations. With respect to dynamic profiling, profiling may be described as a form of dynamic program analysis that measures the space (e.g., memory) or time complexity of an application, the usage of particular instructions, or the frequency and duration of function calls. A relative weightage may be assigned to each aspect such as control flow, dependencies, runtime profiling, etc., and a combined vector may be generated for each module to recommend which classes have a formal basis to be maintained together in a partition.

According to examples, the system, method, and non-transitory computer readable medium disclosed herein may provide for the performance of a "what-if "analysis by changing different variable thresholds based on project constraints, to thus yield different valid application partitions to be packaged into container images and microservices.

According to examples, the system, method, and non-transitory computer readable medium disclosed herein may provide for extension of the partitioning approach disclosed herein by using multi-objective optimization to provide different feasible partitions that optimize the affinity of the modules in each of the partitions.

Based on the foregoing, depending on the information available, one or more of the aforementioned analysis, which address different aspects of the application, may be used to recommend valid partitions of the application. For example, the aforementioned analysis may include semi-automated functional context analysis, static analysis of code to detect cohesive blocks and dependencies, analysis of control flow to detect highly interacting modules, dynamic profiling information to detect runtime flow and usage, and recommended partitions of code for partitioning of an application into microservices and container images.

The system, method, and non-transitory computer readable medium disclosed herein may provide for technical benefits such as objective partitioning of existing applications for migration to new platforms. In this regard, the system, method, and non-transitory computer readable medium disclosed herein may provide for partitioning of existing applications (e.g., for migration) by generating pair-wise affinity vectors between modules of the application, which when composed together may be used to determine which of the modules need to be in the same partition. The system, method, and non-transitory computer readable medium disclosed herein may also provide for the performance of a what-if analysis by changing different variable thresholds based on project constraints, to thus yield different valid application partitions. The system, method, and non-transitory computer readable medium disclosed herein may thus reduce and/or eliminate unnecessary utilization of computing resources due to an erroneous partitioning that may lead to a relatively significant number of cross-partition calls and unhandled dependencies that may affect the performance, reliability, and maintainability of the partitioned application.

In some examples, elements of the partitioning based migration of systems to container and microservice based platforms system may be machine readable instructions stored on a non-transitory computer readable medium. In this regard, the partitioning based migration of systems to container and microservice based platforms system may include or be a non-transitory computer readable medium. In some examples, the elements of the partitioning based migration of systems to container and microservice based platforms system may be hardware or a combination of machine readable instructions and hardware.

FIG. 1 illustrates an architecture of a partitioning based migration of systems to container and microservice based platforms system 100 (hereinafter "system 100"), according to an example of the present disclosure.

Referring to FIG. 1, the system 100 may include a resource identifier 102 that is executed by at least one hardware processor (e.g., the hardware processor 1902 of FIG. 19, and/or the hardware processor 2104 of FIG. 21) to ascertain source code 104 for an application 106 that is to be partitioned.

The resource identifier 102 may determine, based on an analysis of the ascertained source code 104, an entity model 108 corresponding to the application 106. With respect to the entity model 108, in legacy applications such as the application 106, the plain object classes may represent entities, or the model classes in model-view-controller (MVC) framework applications, or the classes annotated as the 'entity' in various frameworks such as SPRING JAVA. These classes with the other dependent classes may form the entity model 108 of an application.

The resource identifier 102 may identify, based on application of a resource identification rule (e.g., of a set of resource identification rules 110) to the ascertained source code 104, resources 112 (e.g., potential resources) associated with the application 106. According to examples, the resource identifier 102 may identify, based on application of the resource identification rule to the ascertained source code 104, the resources 112 associated with the application 106 by analyzing, based on application of the resource identification rule to a uniform resource identifier of the ascertained source code 104, a resource of the resources 112 associated with the application 106. In addition, or in other examples, the resource identifier 102 may identify, based on application of the resource identification rule to the ascertained source code 104, the resources 112 associated with the application 106 by removing scheme, authority, and version values associated with the uniform resource identifier of the ascertained source code 104.

Further, the resource identifier 102 may determine a mapping of the identified potential resources to entities of the entity model 108.

According to an example, a resource dependent code identifier 114 that is executed by the at least one hardware processor may group the associated methods identified for a given resource along with the dependent attributes which have been used within the methods to form the resource code block. In this regard, dependencies 116 may be identified for each of the mapped resources.

According to examples, with respect to a structural, static, and control flow analyzer 118 that is executed by the at least one hardware processor, the dependencies 116 may be identified for each of the mapped resources by identifying, based on a structural graph, a dependency graph, and a control flow graph, the dependencies for each of the mapped resources.

According to examples, with respect to the dependencies 116 for each of the mapped resources, a method 1 in resource A may be dependent on method 1 and method 2 in Resource B, as provided by a dependency graph which derives the dependency metric between resources. Similarly, the structural flow, control flow, and runtime flow metrics may be derived between resources, and may be used to determine the affinity score between resources.

Figure 15:
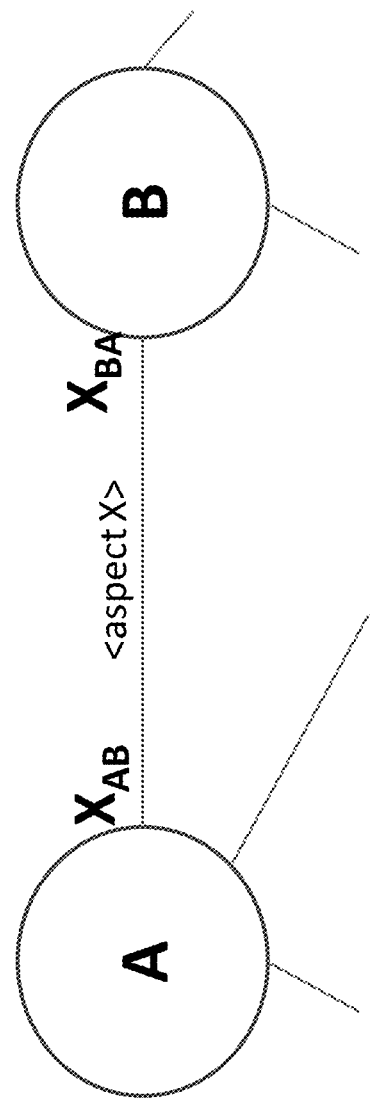
FIG. 15 illustrates affinity between modules to illustrate operation of the partitioning based migration of systems to container and microservice based platforms system of FIG. 1, according to an example of the present disclosure.

A resource affinity graph generator 120 that is executed by the at least one hardware processor may generate, based on the dependency and control flow metrics, affinity values 122 between the mapped resources. For example, suppose Resource A has dependencies on 4 classes/methods of Resource B and 6 classes/methods of Resource C, then the Resource A's affinity vector with respect to dependencies from Resource A to Resource B is 4/(4+6)=0.4, and similarly the affinity vector from Resource A to Resource C is 6/(4+6)=0.6. Similarly for control flow, the calculation will be the ratio of transfer of controls to different other resources/modules. The resource affinity graph generator 120 may generate, based on the affinity values 122, a resource affinity graph 124. The resource affinity graph 124 may include resource as a node and the directional affinity value as the weight on the adjoining edge between two resource nodes (the affinity values may be pairwise generated, as explained earlier). Once the pairwise affinity values between all the resources of an application are determined, the resource affinity graph 124 may be generated a visualization of the matrix which has the calculated pairwise affinity values as shown in FIG. 15. Thus, the resource affinity graph generator 120 may determine, for the resource affinity graph 124 and based on weights assigned to the dependency and control flow metrics, an affinity score between each of the mapped resources.

According to examples, the resource affinity graph generator 120 may determine, for the resource affinity graph 124 and based on weights assigned to the dependency and control flow metrics, the affinity score between each of the mapped resources by determining, for the resource affinity graph 124 and based on equal weights assigned to the dependency and control flow metrics, the affinity score between each of the mapped resources.

According to examples, the resource affinity graph generator 120 may determine, for the resource affinity graph 124 and based on weights assigned to the dependency and control flow metrics, the affinity score between each of the mapped resources by determining, for the resource affinity graph 124 and based on different weights assigned to the dependency and control flow metrics, the affinity score between each of the mapped resources. In this regard, a weighted average affinity score associated with the dependency and control flow metrics may be determined.

A cluster identifier 126 that is executed by the at least one hardware processor may generate, based on the affinity scores between the mapped resources, resource clusters 128 that correspond to partitions of the application 106.

According to examples, the cluster identifier 126 may generate, based on the affinity scores between the mapped resources, the resource clusters 128 that correspond to partitions of the application 106 by identifying, based on the determined affinity scores between the mapped resources, a highest affinity score, and clustering, based on the identification of the highest affinity score, the mapped resources corresponding to the highest affinity score.

According to examples, the cluster identifier 126 may generate, based on the affinity scores for the mapped resources, the resource clusters 128 that correspond to the partitions of the application 106 by ascertaining an affinity score threshold value, identifying clusters for which the affinity score is greater than the affinity score threshold value, and generating, based on the identified clusters for which the affinity score is greater than the affinity score threshold value, the resource clusters 128 that correspond to the partitions of the application 106.

An application re-architecturer 130 may re-architect the application 106 based on the resource clusters 128 identified by the cluster identifier 126.

Referring to FIGS. 1-18, operation of the components of FIG. 1 is described in further detail.

Figure 2:
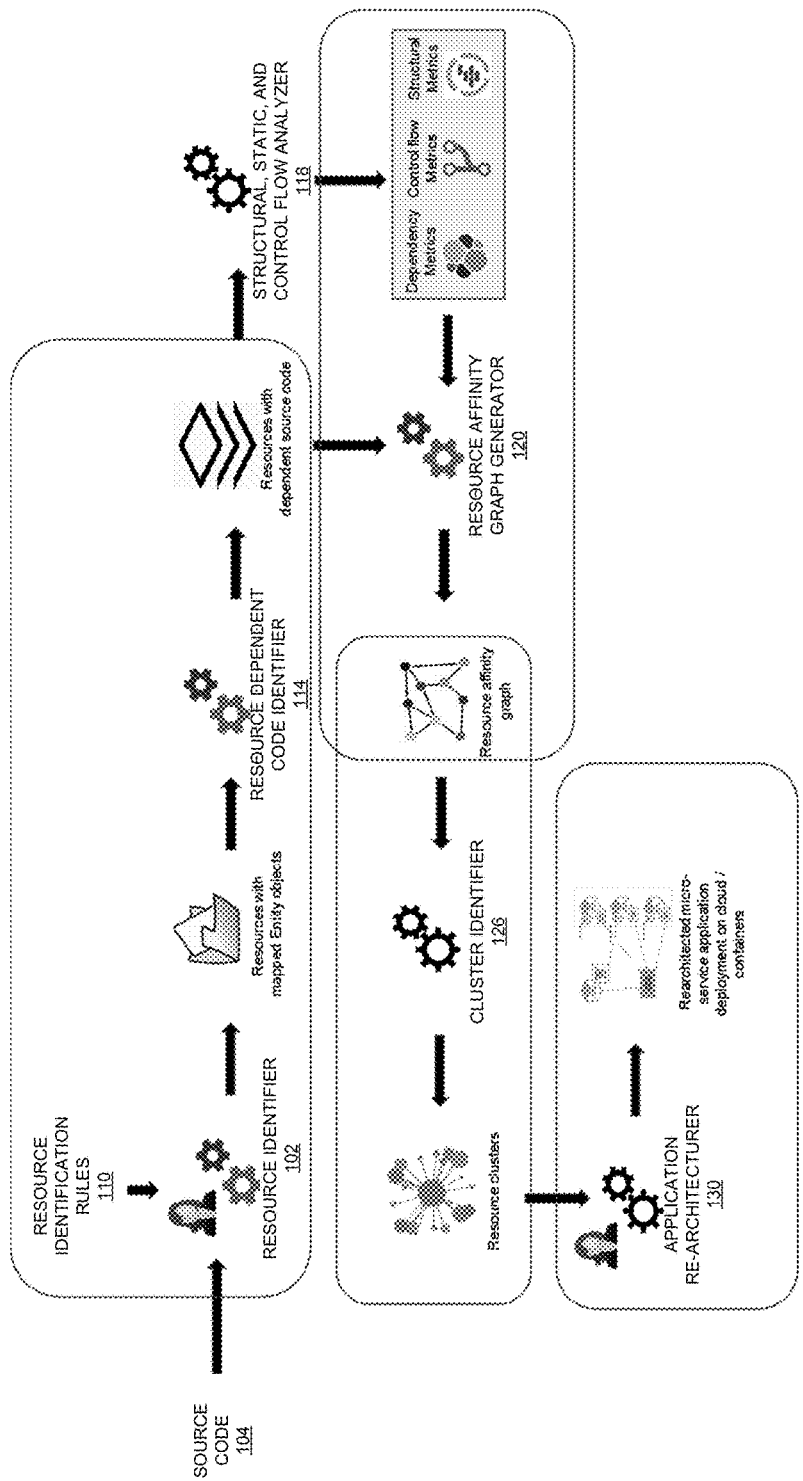
FIG. 2 illustrates further details of the architecture of the partitioning based migration of systems to container and microservice based platforms system of FIG. 1, according to an example of the present disclosure.

FIG. 2 illustrates further details of the architecture of the system 100, according to an example of the present disclosure.

Referring to FIG. 2, the resource identifier 102 may identify the resources 112 within the application 106 using the resource identification rules 110 (which may also be referred to as "resource identification rules") and the entity model 108 derived, for example, using static code analysis. The resource identifier 102 may parse a uniform resource identifier (URI) to identify the resources 112. Further, the resource identifier 102 may parse the uniform resource identifier to identify, based on a mapping of the resources 112 to the entity model 108, mapped entities within the application 106.

In order to identify the resources 112 within the application 106, the resource identifier 102 may identify uniform resource identifier annotated methods within the application 106. The uniform resource identifier annotated methods may be saved in a URI_annotation_tuple {class, method, URI, Value}.

The resource identifier 102 may sort the URI_annotation_tuple values in descending order of the word count within the uniform resource identifier. For each uniform resource identifier field of the URI_annotation_tuple, the resource identifier 102 may apply the resource identification rules 110 as follows.

For a first resource identification rule of the resource identification rules 110, the resource identifier 102 may identify and remove scheme, authority, and version values from the URI_annotation_tuple. The remaining phrase known as 'path' may include the resource values mentioned in the hierarchy.

For a second resource identification rule of the resource identification rules 110, the resource identifier 102 may parse the 'path', and identify potential resources using existing resource_tuple values and the resource identification rules 110, and save the potential resources in resource_tuple {method, dictionary<resource, entity>}. In this regard, the entity value for all resources may be null.

For a third resource identification rule of the resource identification rules 110, the resource identifier 102 may identify the associated entity for each potential resource and update the identified entity in resource_tuple {method, dictionary<resource, entity>}. In this regard, if a match or resources are not identified, user input may be utilized.

For a fourth resource identification rule of the resource identification rules 110, the resource identifier 102 may tag each method for a unique resource where the method will exist in the code. The method may be tagged to the last resource in the resource hierarchy, e.g., resources field of the resource_tuple. The tagged method may be updated in the resource_tuple {method, dictionary<resource, entity>, belonging_resource}.

The resource identifier 102 may further utilize resource rules, non-resource rules, and alternate rules with respect to identification of resources and non-resources.

With respect to resource rules, for a first resource rule, if a phrase includes '?', then the phrase before this phrase will include a resource. For a second resource rule, if a phrase includes '#', then the phrase before this phrase will include a resource. For a third resource rule, if a phrase ends with file extensions such as {json, xml}, then the phrase includes a resource. For a fourth resource rule, if a phrase is part of an existing resource dictionary, then the phrase is identified as a resource.

With respect to non-resource rules, for a first non-resource rule, if any phrase starts with '{' and ends with '}', then that phrase is a non-resource. For a second non-resource rule, if any phrase is numeric, then that phrase is a non-resource. For a third non-resource rule, if any phrase includes '*', then that phrase is a non-resource. For a fourth non-resource rule, if any phrase includes actionable words such as {edit, new, delete, update}, then that phrase is a non-resource. For a fifth non-resource rule, if a phrase ends with the file extension such as {html, jsp}, then the phrase is a non-resource.

With respect to alternate rules, if any phrase is identified as non-resource, then the phrase after and before that phrase should be a resource. If any phrase is identified as resource, then the phrase after and before that phrase should be a non-resource.

The resource dependent code identifier 114 may identify dependent code files which may be entities (model), repository class, or plain old java object (POJO) classes. The resource dependent code identifier 114 may utilize an entity graph, dependency, and control flow graphs to identify the code (class) dependencies for the resource.

The resource dependent code identifier 114 may utilize a resource_tuple {method, dictionary<resource, entity>, belonging_resource} to arrange the identified resources along with the mapped methods as resource_methods_tuple {resource, List<method>}. With respect to application source code, the resource dependent code identifier 114 may perform structural and static analysis to generate structural, control flow, and dependency graphs for the application 106. For all methods of the resource in resource_methods_tuple, the resource dependent code identifier 114 may identify the dependent entities, repositories, and POJO classes using the various application graphs. With respect to utilization of an entity graph, dependency, and control flow graphs to identify the code (class) dependencies for the resource, for example, the method 1 for the Resource A depends on the entity 1 class or depends on the repository 1 class as depicted in the dependency flow graph of the application, hence the entity 1 and repository 1 classes may be identified as the dependent code files for resource A.

The structural, static, and control flow analyzer 118 may generate the structural, dependency, control flow, and other metrics (e.g., run time metrics) for the application 106. The structural metric may depict whether two given resources are part of the same structural cluster such as JAVA package, and if they are, then the structural metric will be 1, and otherwise 0. The dependency metric value may depict the dependency between the given resource with the other resources and sum of the dependencies may be set to 1. Based on the dependencies between the resources, these metrics may be determined. For example, Resource A has 10 dependencies to Resource B, 5 dependencies with Resource C, and 35 dependencies with Resource D, which leads to the dependency metric between Resource(A, B) as 10/10+5+35=0.20, Resource(A, C) as 5/50=0.10 and Resource(A, D) as 35/50=0.7. Similarly the other score for control flow and runtime metrics may also be determined. The results of the structural, static, and control flow analyzer 118 may be used, for example, by the resource affinity graph generator 120, the cluster identifier 126, etc., for clustering of the resources 112.

The resource affinity graph generator 120 may generate, based on various aspects such as structure, dependency, control flow, and runtime dependency, affinity values between resources 112. The resource affinity graph generator 120 may determine the final resource affinity score based on the various aspects associated with the structural, static, and control flow analyzer 118, and generate a weighted resource affinity graph using those values. The resource affinity graph generator 120 may utilize predetermined or user-specified aspect weightages. The affinity score between resources may be derived based on aspect weightage and its affinity values. The final affinity score (combined aspects) may be determined and utilized to identify resource clusters as disclosed herein.

The cluster identifier 126 may utilize the weighted resource affinity graph, to identify resource clusters. The clusters may be generated based, for example, on a predetermined or a user-specified maximum number of clusters needed. Additionally or alternatively, the clusters may be generated based on the affinity score above a predetermined or a user-specified threshold score.

The application re-architecturer 130 may re-architect the application 106 based on the resource clusters identified by the cluster identifier 126. Once the resource clusters are derived, the application re-architecturer 130 may generate a separate (e.g., new) application (or projects) based on the resource clusters along with the resource dependent code files. The application re-architecturer 130 may generate the separate application (or project) for each cluster which is separately compilable. The application re-architecturer 130 may implement a communication mechanism such as micro-service discovery pattern between the various applications which may be deployed to a cloud infrastructure. Further, the application re-architecturer 130 may implement communication code (e.g., discovery pattern, etc.) between the various micro-service applications.

The re-architected application may then be tested to ensure that the re-architected application is performing the same (or similarly) as the original legacy application 106. The re-architected application may then be deployed to the cloud infrastructure on containers.

With respect to resource clustering based on affinity scores between various resources, the structural, static, and control flow analyzer 118, the cluster identifier 126, the resource affinity graph generator 120, and the application re-architecturer 130 may operate as follows.

The structural, static, and control flow analyzer 118 may determine the structural graph that provides the information about the structural clustering of resources 112 identified based on the package in which the resource methods reside using resource_methods_tuple {resource, List<method>}. The structural, static, and control flow analyzer 118 may determine the control flow and dependency graphs which provide the information about the coupling and cohesion between the resources source code. For a given resource, with respect to statistics for the control flow, dependencies may be averaged out and used as the affinity score between the resource and other resources. With respect to the resource affinity graph generator 120, dependency, control flow, and structural metrics may provide the relevant resource affinity weightages that may be used to derive the resource affinity graph. The cluster identifier 126 may identify clusters from the resource affinity graph based on clustering goals such as a total number of micro-services, and/or a predetermined or user-specified threshold for the resource affinity score. The application re-architecturer 130 may re-architect the application 106 using the generated resource clusters, and the micro-services may be also created. The application re-architecturer 130 may implement the microservice communication standard for the microservices, which may be deployed on a cloud infrastructure.

Figure 3:
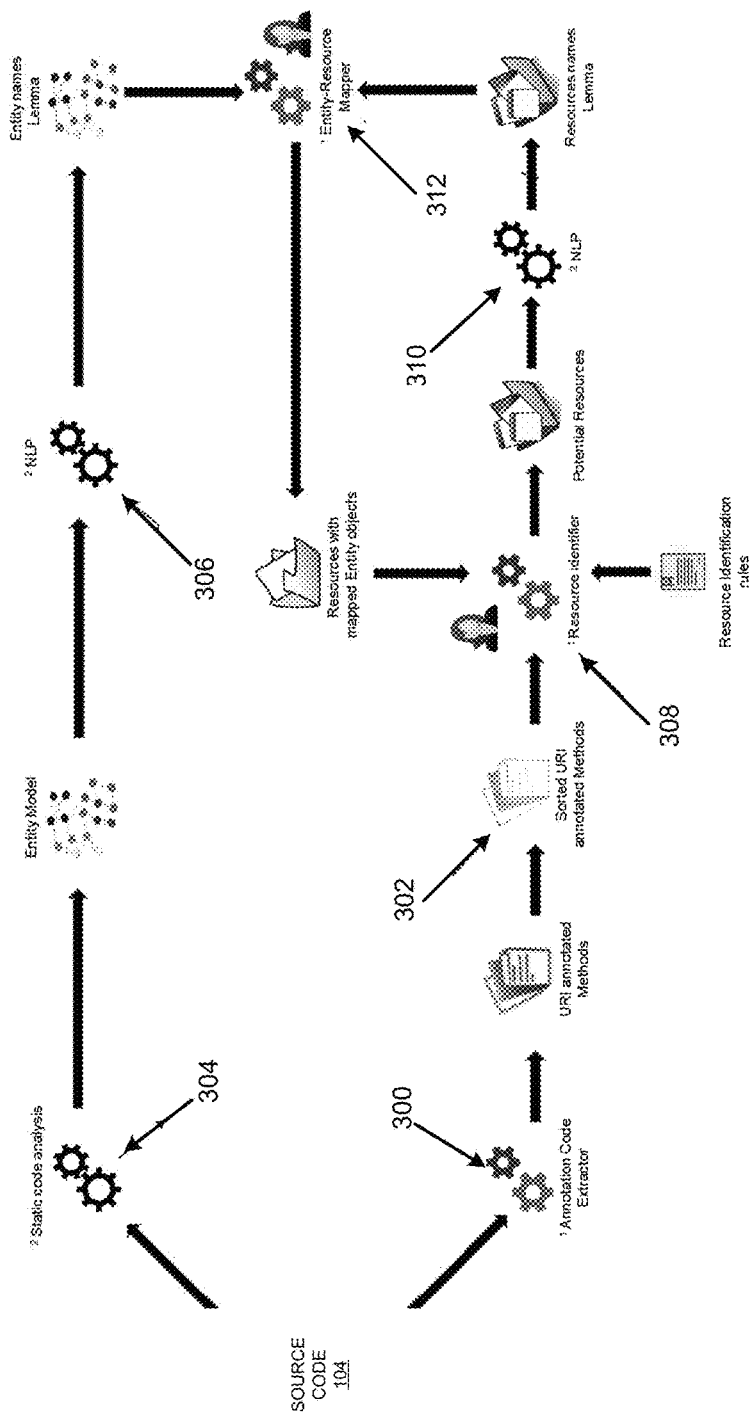
FIG. 3 illustrates details of a resource identifier of the partitioning based migration of systems to container and microservice based platforms system of FIG. 1, according to an example of the present disclosure.

FIG. 3 illustrates further details of the resource identifier 102 of the system 100, according to an example of the present disclosure.

Referring to FIG. 3, at 300, the resource identifier 102 may extract the REST annotated methods from the source code of the application 106. At 302, the resource identifier 102 may sort the uniform resource identifier based on the descending order of the number of words. At 304, the resource identifier 102 may perform static analysis on the code of the application 106 to generate the entity model. At 306, the resource identifier 102 may perform natural language processing and identify the entity lemma, where a lemma is the canonical form, dictionary form, or citation form of a set of words. For example, run, runs, ran and running are forms of the same lexeme, with run as the lemma. At 308, the resource identifier 102 may use text analysis to parse each uniform resource identifier to identify the potential resources using the aforementioned resource identification rules, and already identified resources. At 310, the resource identifier 102 may perform natural language processing, and identify the resource lemma. At 312, the resource identifier 102 may identify a match between the entity and the resource (e.g., with respect to the entity model 108). In case of single entity and resource, the resource identifier 102 may identify a direct match. In case of multiple entities and resources, the resource identifier 102 may utilize a string match between their lemmas.

Figure 4:
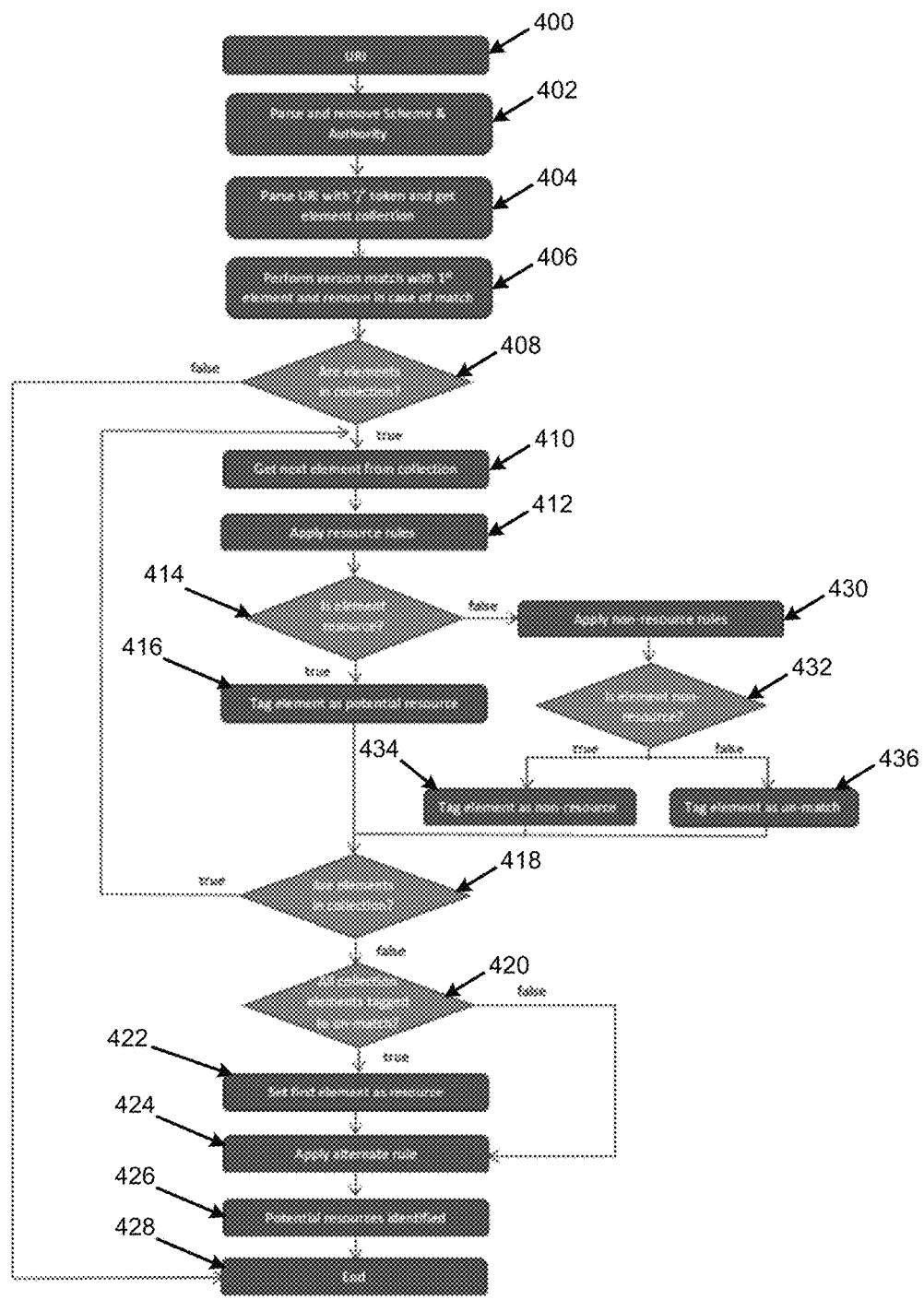
FIGS. 4 and 5 illustrate process flows of the resource identifier of FIG. 3, according to an example of the present disclosure.
Figure 5:
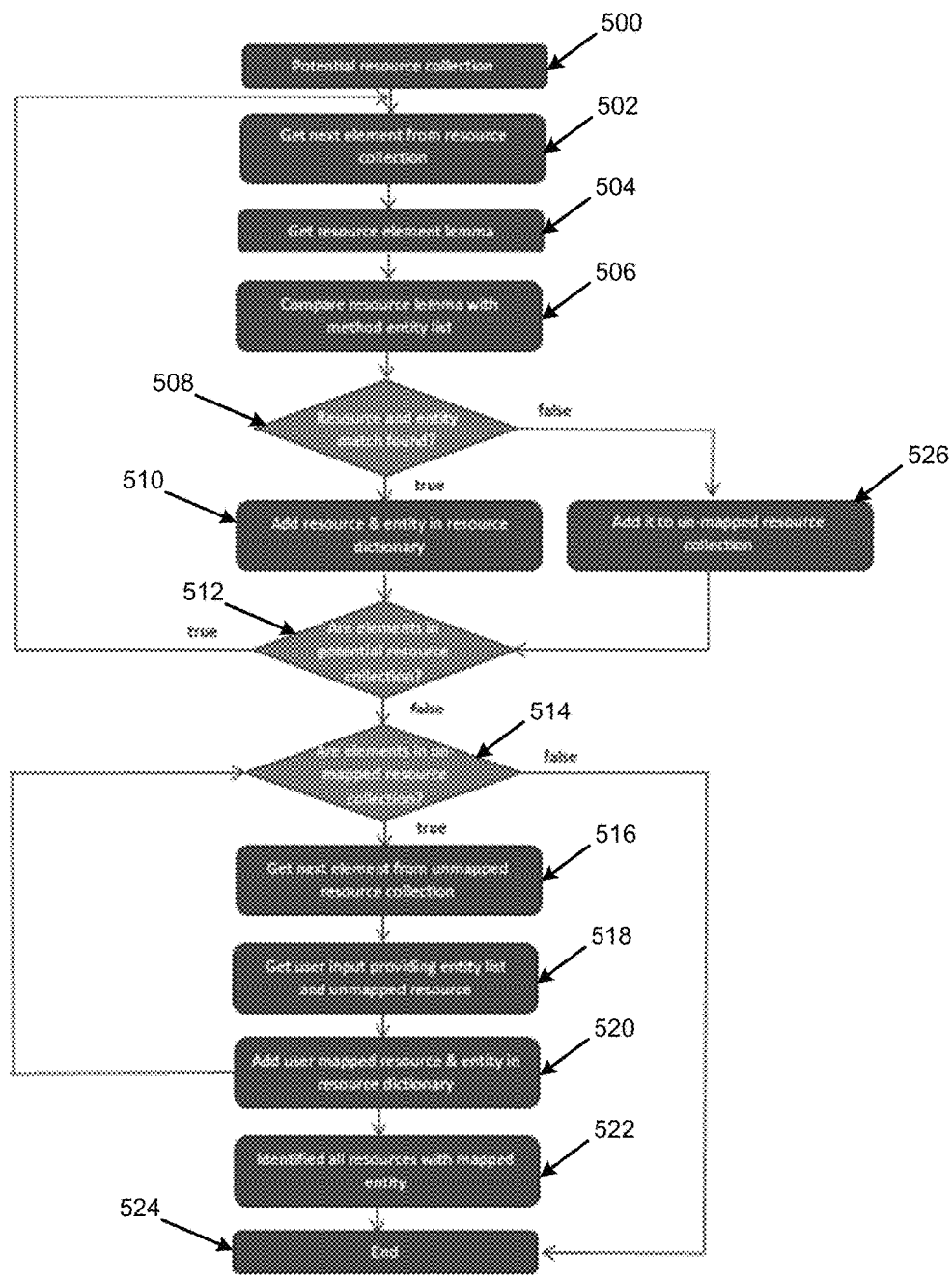

FIGS. 4 and 5 illustrate process flows of the resource identifier 102 of FIG. 3, according to an example of the present disclosure.

Referring to FIG. 4, at block 400, the resource identifier 102 may ascertain a uniform resource identifier with respect to the application 106.

At block 402, the resource identifier 102 may parse the uniform resource identifier, and remove scheme and authority with respect to the uniform resource identifier.

At block 404, the resource identifier 102 may parse the uniform resource identifier from block 400 with "l" token, and determine all word elements which are stored in an element collection.

At block 406, the resource identifier 102 may perform version match using the regex in the version specific format which has characters followed by the numerals with the dot (e.g., v1.1) with the first element, and remove in the case of a match.

At block 408, the resource identifier 102 may determine whether elements are present in the collection.

Based on a determination at block 408 that elements are in the collection, at block 410, the resource identifier 102 may get the next element from the collection.

At block 412, the resource identifier 102 may apply the resource rules as disclosed herein.

At block 414, the resource identifier 102 may determine whether the element is a resource.

Based on a determination at block 414 that the element is a resource, at block 416, the resource identifier 102 may tag the element as a potential resource.

At block 418, the resource identifier 102 may determine whether more elements are in the collection.

Based on a determination at block 418 that elements are not in the collection, at block 420, the resource identifier 102 may determine whether all collection elements are tagged to un-match.

Based on a determination at block 420 that all collection elements are tagged to un-match, at block 422, the resource identifier 102 may set the first element as a resource.

At block 424, further to block 422, the resource identifier 102 may apply an alternate rule. In this regard, based on a determination at block 420 that all collection elements are not tagged to un-match, at block 424, the resource identifier 102 may apply an alternate rule.

At block 426, the potential resources may be identified by the resource identifier 102.

At block 428, processing with respect to resource identification may be completed.

Based on a determination at block 414 that the element is not a resource, at block 430, the resource identifier 102 may apply non-resource rules.

At block 432, the resource identifier 102 may determine whether the element is a non-resource.

Based on a determination at block 432 that the element is a non-resource, at block 434, the resource identifier 102 may tag the element as a non-resource.

Based on a determination at block 432 that the element is not a non-resource, at block 436, the resource identifier 102 may tag the element as un-match.

Referring to FIG. 5, at block 500, the resource identifier 102 may ascertain a potential resource collection (e.g., from block 426).

At block 502, the resource identifier 102 may get a next element from the resource collection of block 500.

At block 504, the resource identifier 102 may get a resource element lemma for the element from block 502. For example, for resource 'owners', the lemma will be 'owner'.

At block 506, the resource identifier 102 may compare the resource element lemma with the each entity lemma from the entity list. This list may represent a collection of all the entities present in an application and is populated from the entity model.

At block 508, the resource identifier 102 may determine whether the resource and entity match is found.

Based on a determination at block 508 that a resource and entity match are found, at block 510, the resource identifier 102 may add the resource and entity to a resource dictionary.

At block 512, the resource identifier 102 may determine whether more elements are in the potential resource collection.

Based on a determination at block 512 that elements are not in the potential resource collection, at block 514, the resource identifier 102 may determine whether elements are in an unmapped resource collection.

Based on a determination at block 514 that elements are in the unmapped resource collection, at block 516, the resource identifier 102 may get the next element from the unmapped resource collection.

At block 518, the resource identifier 102 may ascertain user input providing an entity list, and an unmapped resource.

At block 520, the resource identifier 102 may add a user mapped resource, and entity in the resource directory.

At block 522, resources with mapped entity may be identified by the resource identifier 102.

At block 524, processing with respect to resource identification may be completed.

Based on a determination at block 508 that resource and entity match is not found, at block 526, the resource identifier 102 may add the resource and entity to an un-mapped resource collection.

Figure 6:
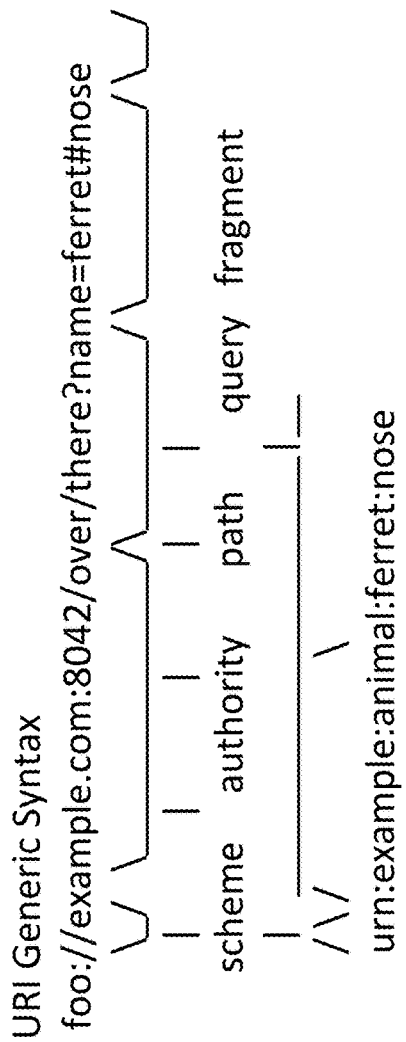
FIG. 6 illustrates uniform resource identifier syntax to illustrate operation of the partitioning based migration of systems to container and microservice based platforms system of FIG. 1, according to an example of the present disclosure.

FIG. 6 illustrates uniform resource identifier syntax to illustrate operation of the system 100, according to an example of the present disclosure.

Referring to FIG. 6, a uniform resource identifier may represent a compact sequence of characters that identifies an abstract or physical resource. The uniform resource identifier may be uniform in that it allows different types of resource identifiers to be used in the same context, even when the mechanisms used to access those resources may differ. The uniform resource identifier may be applicable to different types of resources (the term "resource" may be used for any content that may be identified by a uniform resource identifier). For the uniform resource identifier, the identifier may embody the information needed to distinguish what is being identified from all other aspects within its scope of identification. For the uniform resource identifier, with respect to scheme, each uniform resource identifier may begin with a scheme name that refers to a specification for assigning identifiers within that scheme. Further, with respect to authority, the authority component may be preceded by a double slash ("//"), and may be terminated by the next slash ("/"), question mark ("?"), or number sign ("#") character, or by the end of the uniform resource identifier.

FIG. 6 illustrates a uniform resource identifier "foo://example.com:8042/over/there?name=ferret#nose".

Figure 7:
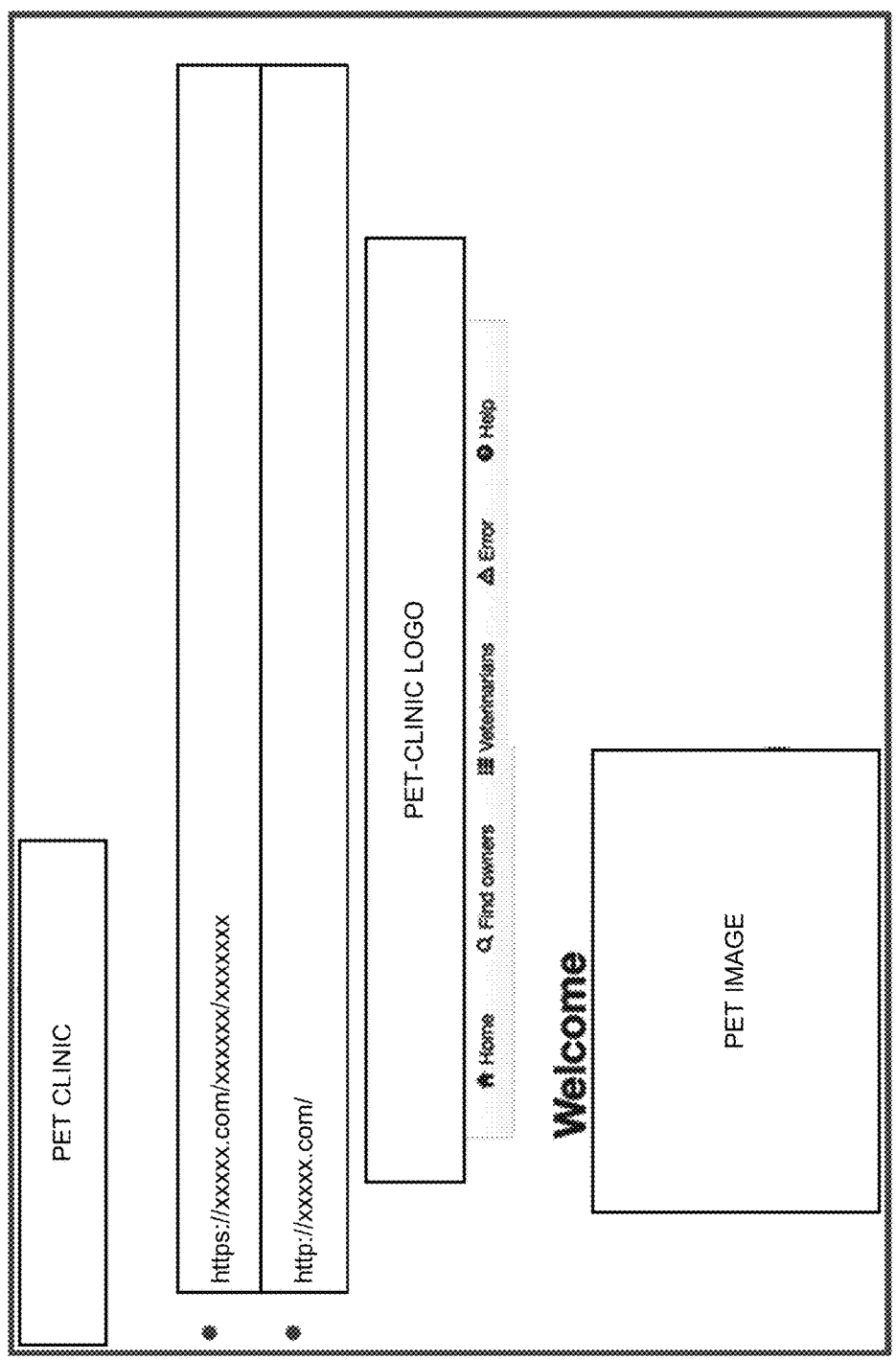
FIG. 7 illustrates operation of the resource identifier of FIG. 3 for a "pet clinic" application, according to an example of the present disclosure.

FIG. 7 illustrates operation of the resource identifier 102 for a "pet clinic" application, according to an example of the present disclosure.

Referring to FIG. 7, various aspects of the "pet clinic" application, such as image, logo, etc., may be displayed on a user-interface display.

Figure 8:
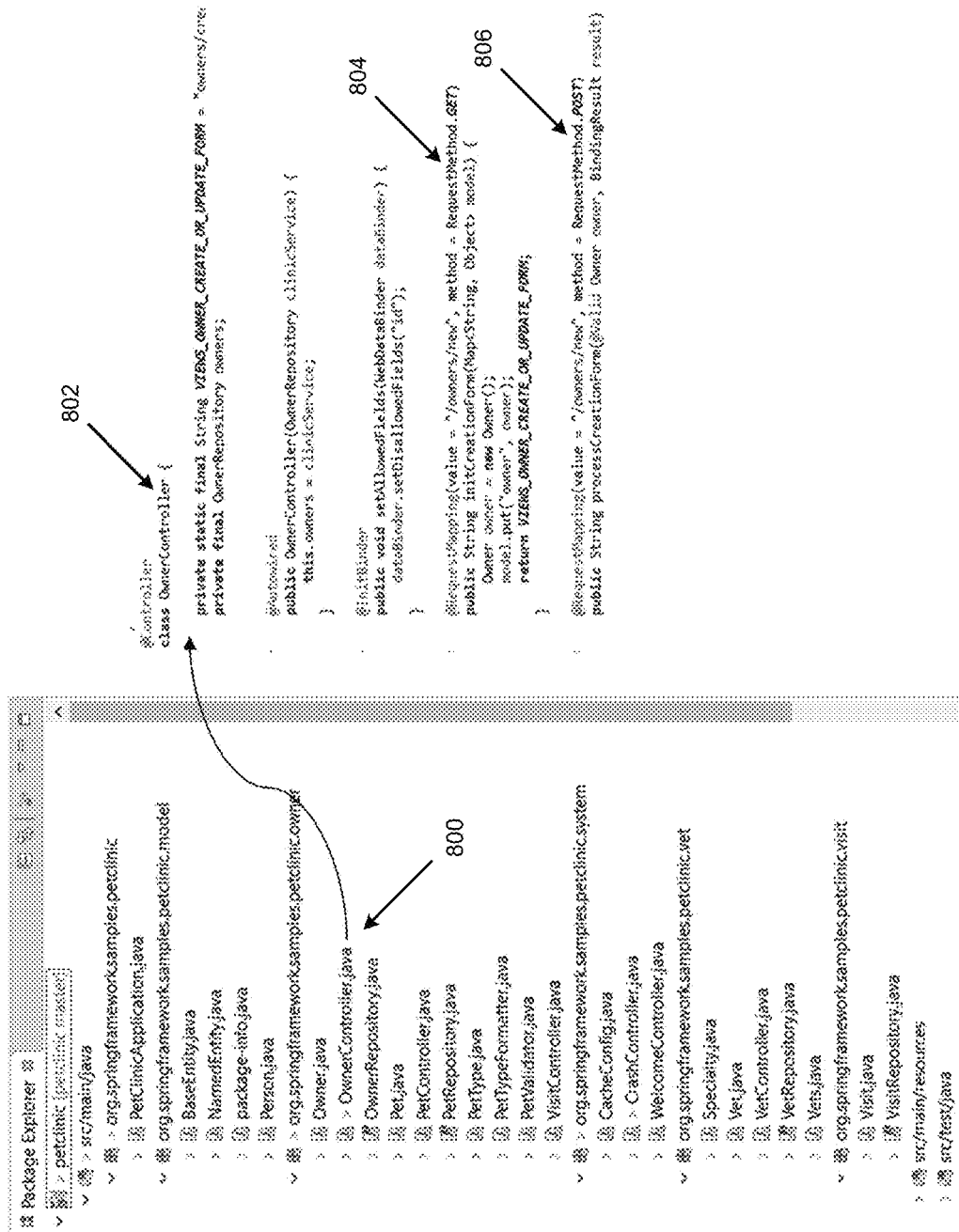
FIG. 8 illustrates identification of resources from source code for the "pet clinic" application of FIG. 7, according to an example of the present disclosure.

FIG. 8 illustrates identification of resources from source code for the "pet clinic" application of FIG. 7, according to an example of the present disclosure.

Referring to FIG. 8, the resource identifier 102 may identify resources from the source code of the application 106. For "OwnerController.java" at 800, the resource identifier 102 may identify "class OwnerController" at 802. The "RequestMapping" at 804 and 806 may include the value that denotes the uniform resource identifier, and the method "RequestMethod". For example, at 804, the value of "/owners/new" may denote the uniform resource identifier.

Figure 9:
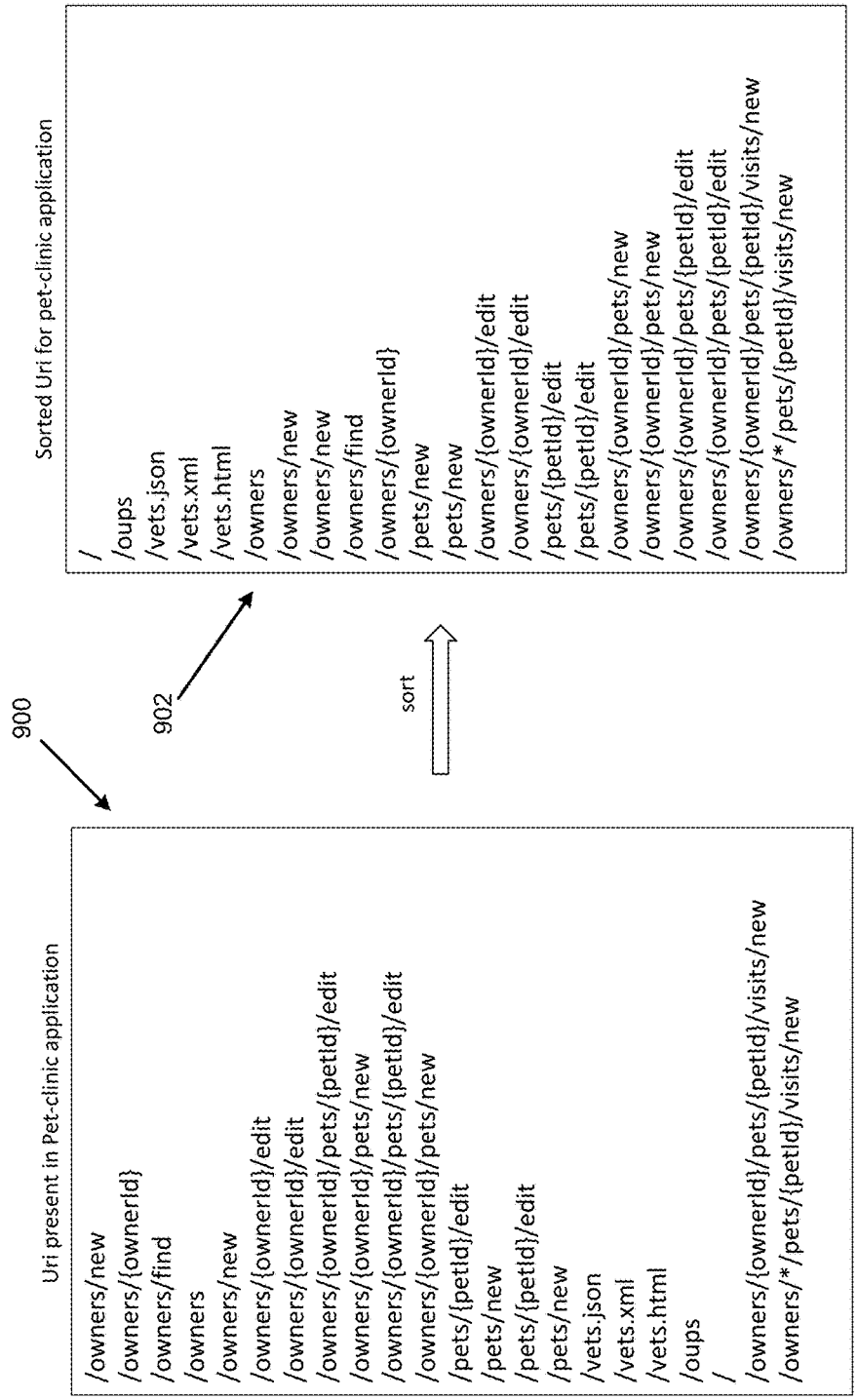
FIG. 9 illustrates uniform resource identifiers and sorted uniform resource identifiers for the "pet clinic" application of FIG. 7, according to an example of the present disclosure.

FIG. 9 illustrates uniform resource identifiers and sorted uniform resource identifiers for the "pet clinic" application of FIG. 7, according to an example of the present disclosure.

Referring to FIG. 9, as described with reference to FIG. 8 at 804 and 806, the value of "/owners/new" may denote the uniform resource identifier. This uniform resource identifier may be used to determine resources and non-resources. The uniform resource identifiers at 900 may be sorted in descending order at 902.

Figure 10A:
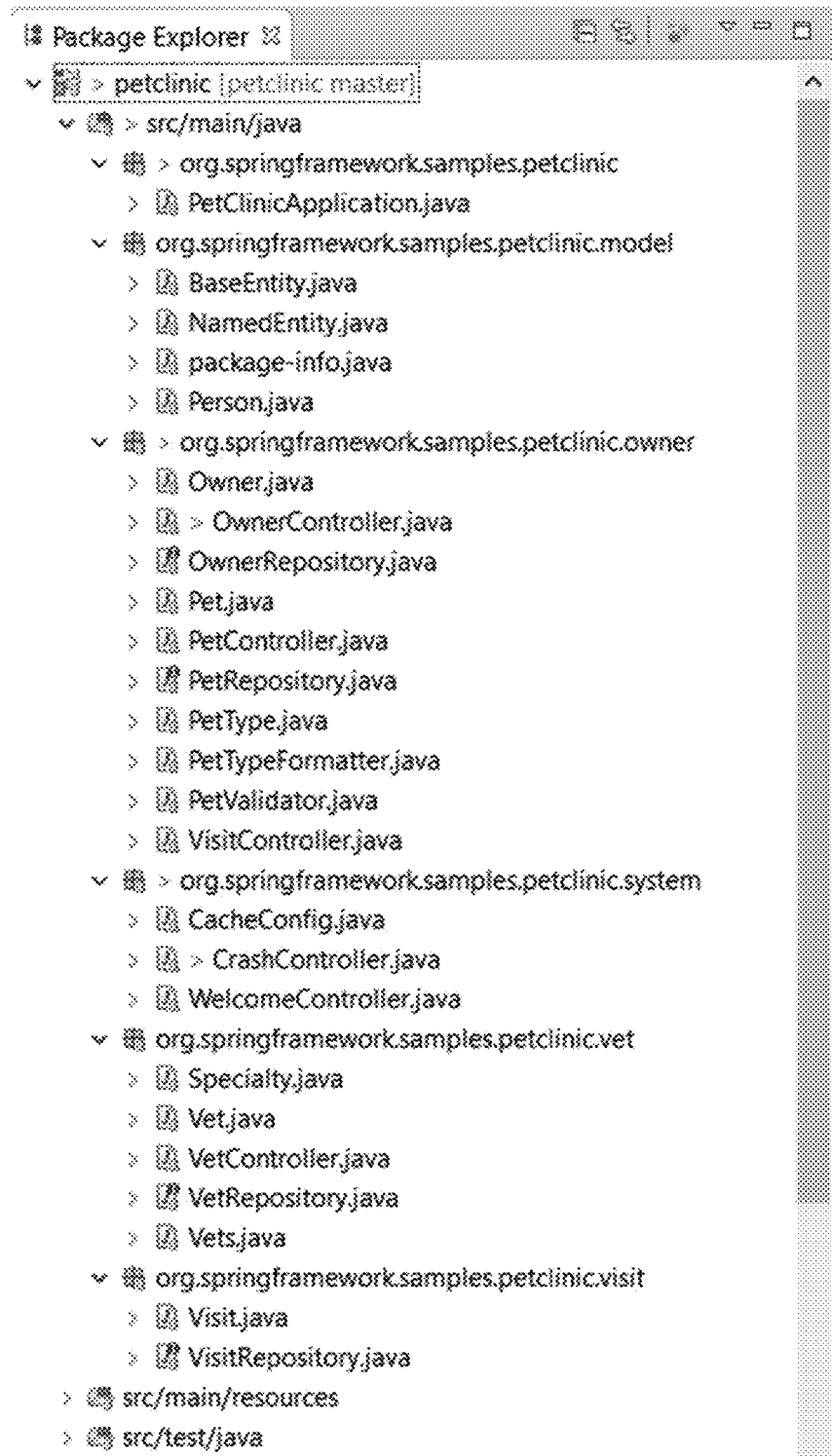
FIG. 10A illustrates source code for the "pet clinic" application of FIG. 7, according to an example of the present disclosure.

FIG. 10A illustrates source code for the "pet clinic" application of FIG. 7, according to an example of the present disclosure.

Referring to FIG. 10A, the source code for the "pet clinic" application may be analyzed to determine an entity model for the application 106.

Figure 10B:
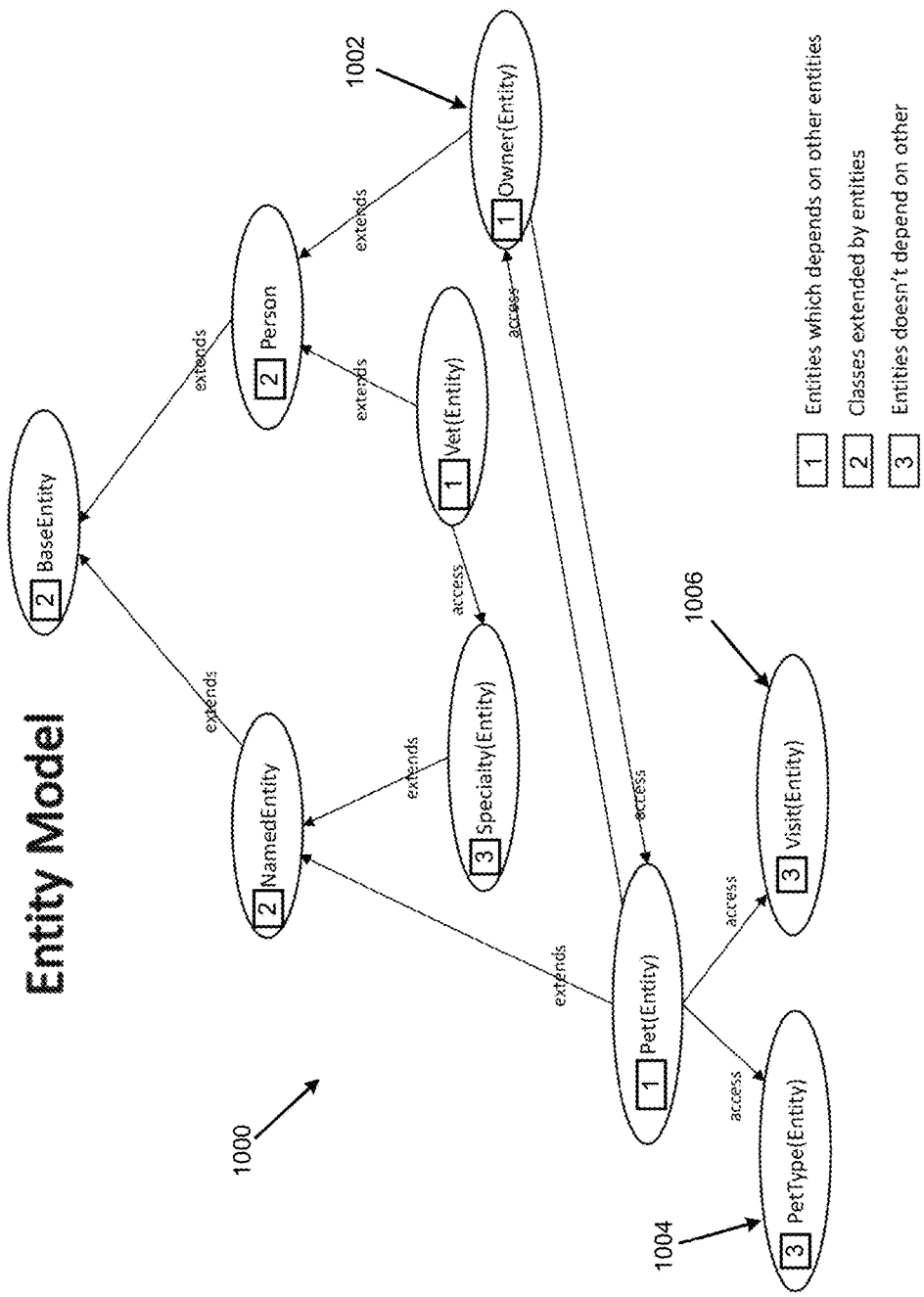
FIG. 10B illustrates an entity model based on static analysis of the source code of FIG. 10A, according to an example of the present disclosure.

FIG. 10B illustrates an entity model based on static analysis of the source code of FIG. 10A, according to an example of the present disclosure.

Referring to FIG. 10B, the entity model at 1000 may be determined based on static analysis of the source code of FIG. 10A for the "pet clinic" application of FIG. 7. The reference "1" may denote entities which depend on other entities, the reference "2" may denote classes extended by entities, and the reference "3" may denote entities that do not depend on other entities. The dependencies between the entities may be denoted as lines/arrows connecting the entities. For example, the "Pet" may be dependent on the "Owner" and vice-versa etc.

Figure 11:
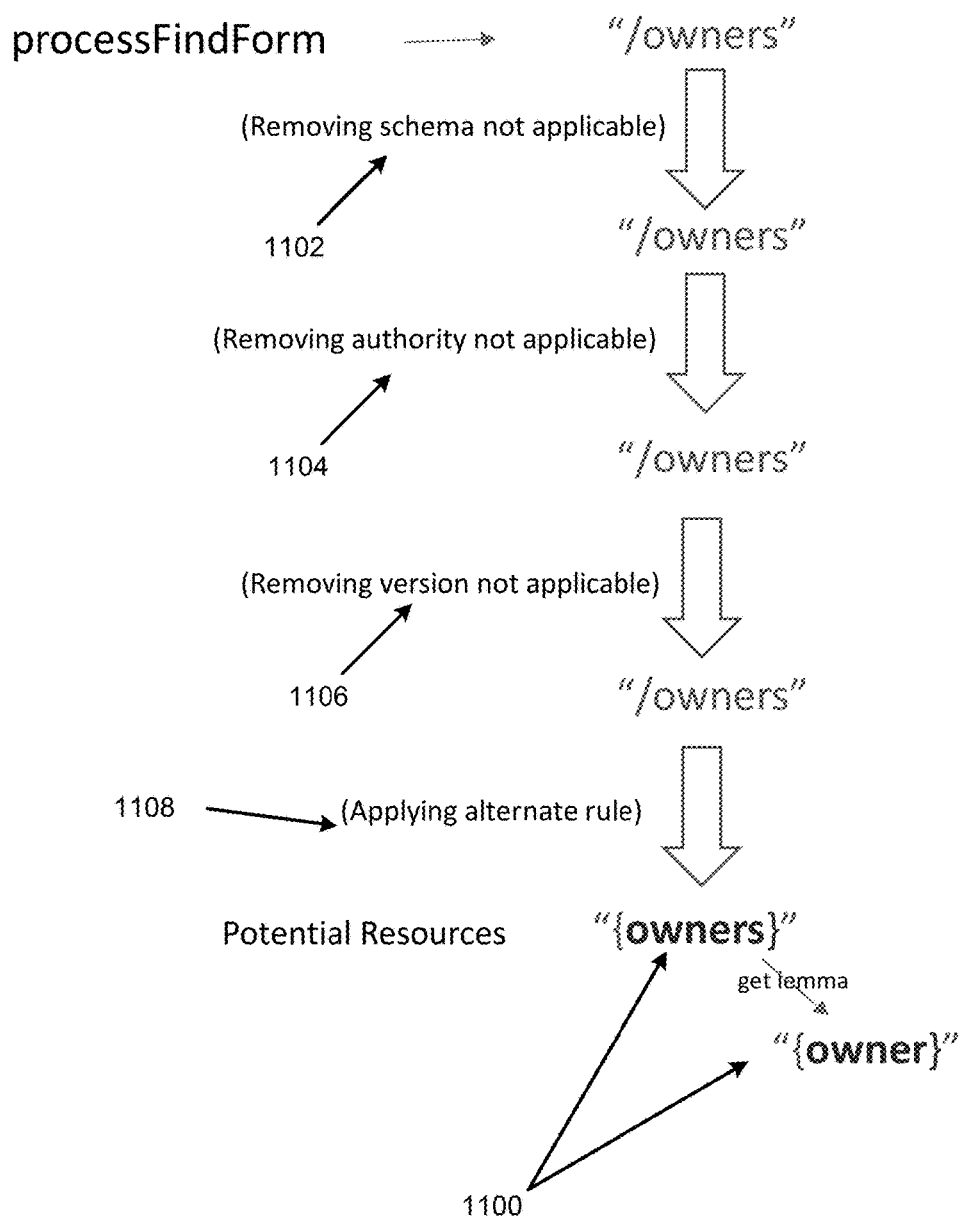
FIG. 11 illustrates an algorithmic flow for identifying a potential resource, such as "owner", and an associated match in the entity model of FIG. 10B, according to an example of the present disclosure.

FIG. 11 illustrates an algorithmic flow for identifying a potential resource, such as "owner", and an associated match in the entity model of FIG. 10B, according to an example of the present disclosure.

Referring to FIG. 11, the resource list determined by the resource identifier 102 may include "owners" and "owner" at 1100, and may match the entity model 1000 of FIG. 10B at 1002. For example, referring to FIG. 8, with respect to the uniform resource identifier "/owners/new", where the "/owners" uniform resource identifier denotes the highest order per the sorting of FIG. 9, at 1102 any schema may be removed. Further, at 1104 and 1106, authority and version may be respectively removed. At 1108, an alternate rule (e.g., from the rules pertaining to resources, non-resources, and alternate) may be applied to determine the potential resources. Next using alternate rule, the lemma for the first element 'owners', i.e., 'owner', may be taken as a resource. Further the lemma 'owner' may be matched with all the entities in the entity model 1000. Based on the match of the "owners" and "owner" at 1100, with the entity model 1000 of FIG. 10B at 1002, the resource may be mapped to the application 106, and more particularly to an entity of the application 106.

Figure 12:
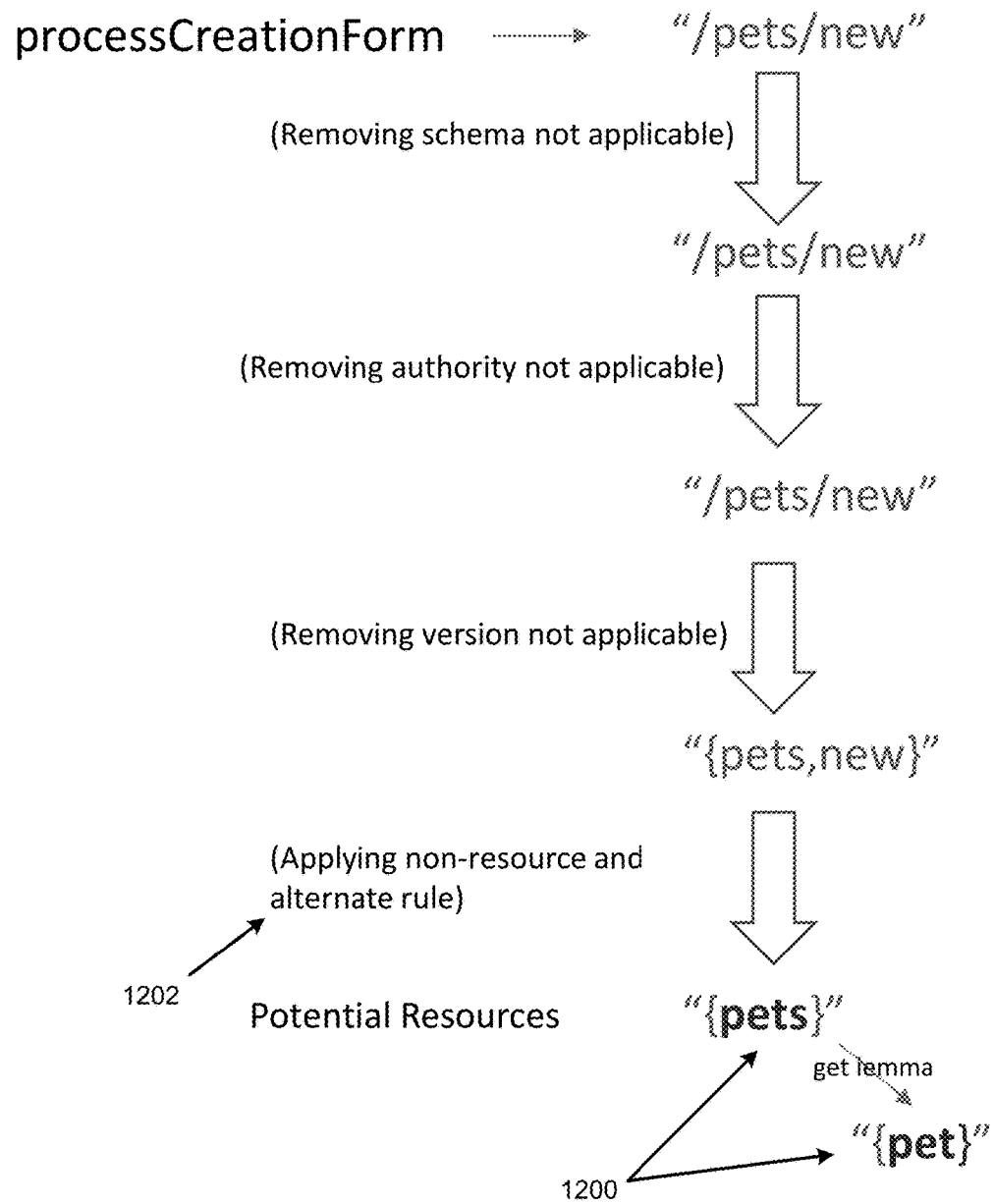
FIG. 12 illustrates an algorithmic flow for identifying a potential resource, such as "pet", and an associated match in the entity model of FIG. 10B, according to an example of the present disclosure.

FIG. 12 illustrates an algorithmic flow for identifying a potential resource, such as "pet", and an associated match in the entity model of FIG. 10B, according to an example of the present disclosure.

Referring to FIG. 9, from the uniform resource identifiers sorted in descending order at 902, the next uniform resource identifier after "/owners" may include "/pets/new". Referring to FIG. 12, the resource list determined by the resource identifier 102 may include "pets" and "pet" at 1200, and may match the entity model 1000 of FIG. 10B at 1004. At 1202, a non-resource rule and an alternate rule (e.g., from the rules pertaining to resources, non-resources, and alternate) may be applied to determine the potential resources.

Figure 13:
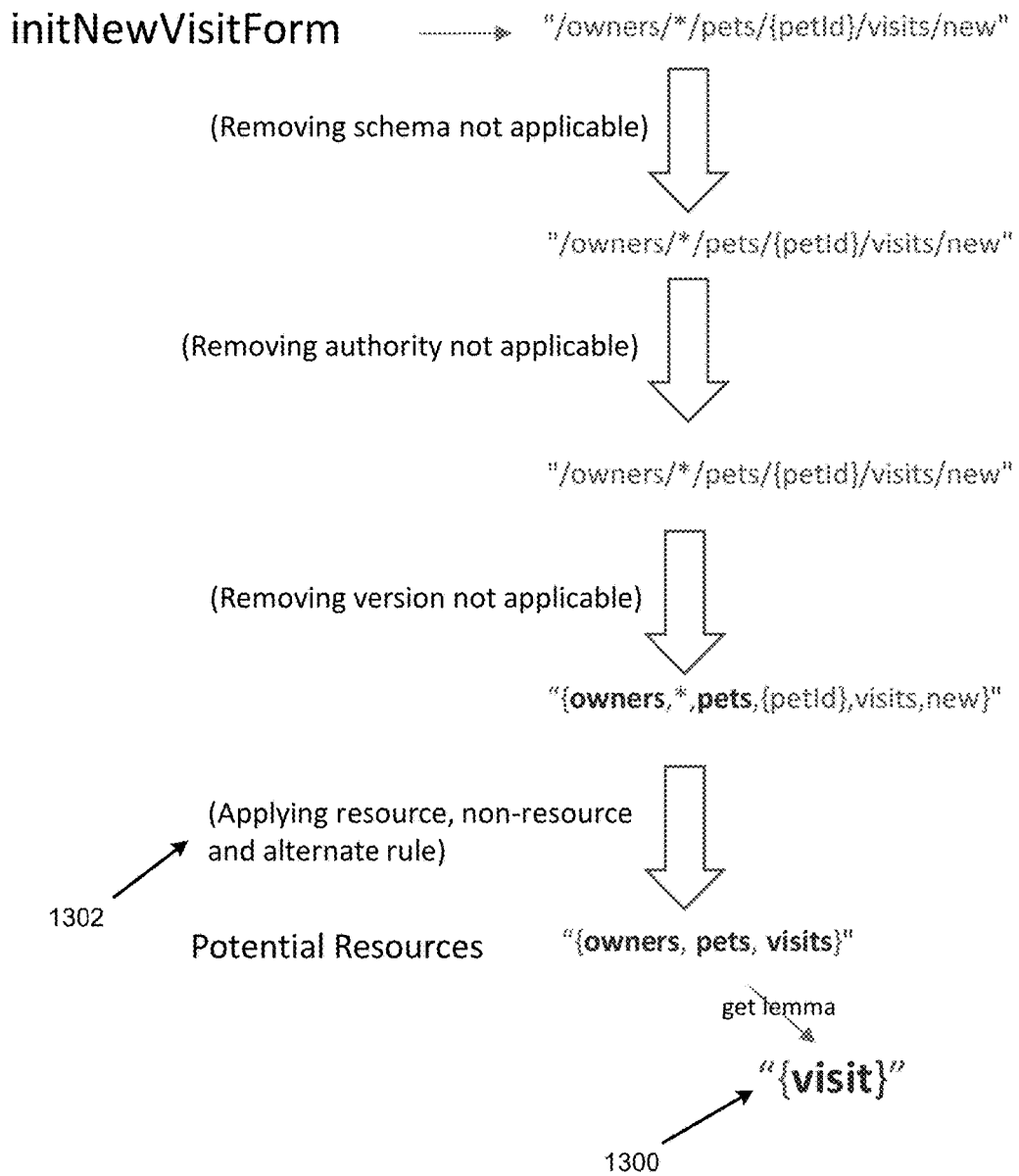
FIG. 13 illustrates an algorithmic flow for identifying a potential resource, such as "visit", and an associated match in the entity model of FIG. 10B, according to an example of the present disclosure.

FIG. 13 illustrates an algorithmic flow for identifying a potential resource, such as "visit", and an associated match in the entity model of FIG. 10B, according to an example of the present disclosure.

Referring to FIG. 13, the resource list determined by the resource identifier 102 may include "visit" at 1300, and may match the entity model 1000 of FIG. 10B at 1006. At 1302, a resource rule, a non-resource rule, and an alternate rule (e.g., from the rules pertaining to resources, non-resources, and alternate) may be applied to determine the potential resources.

Figure 14:
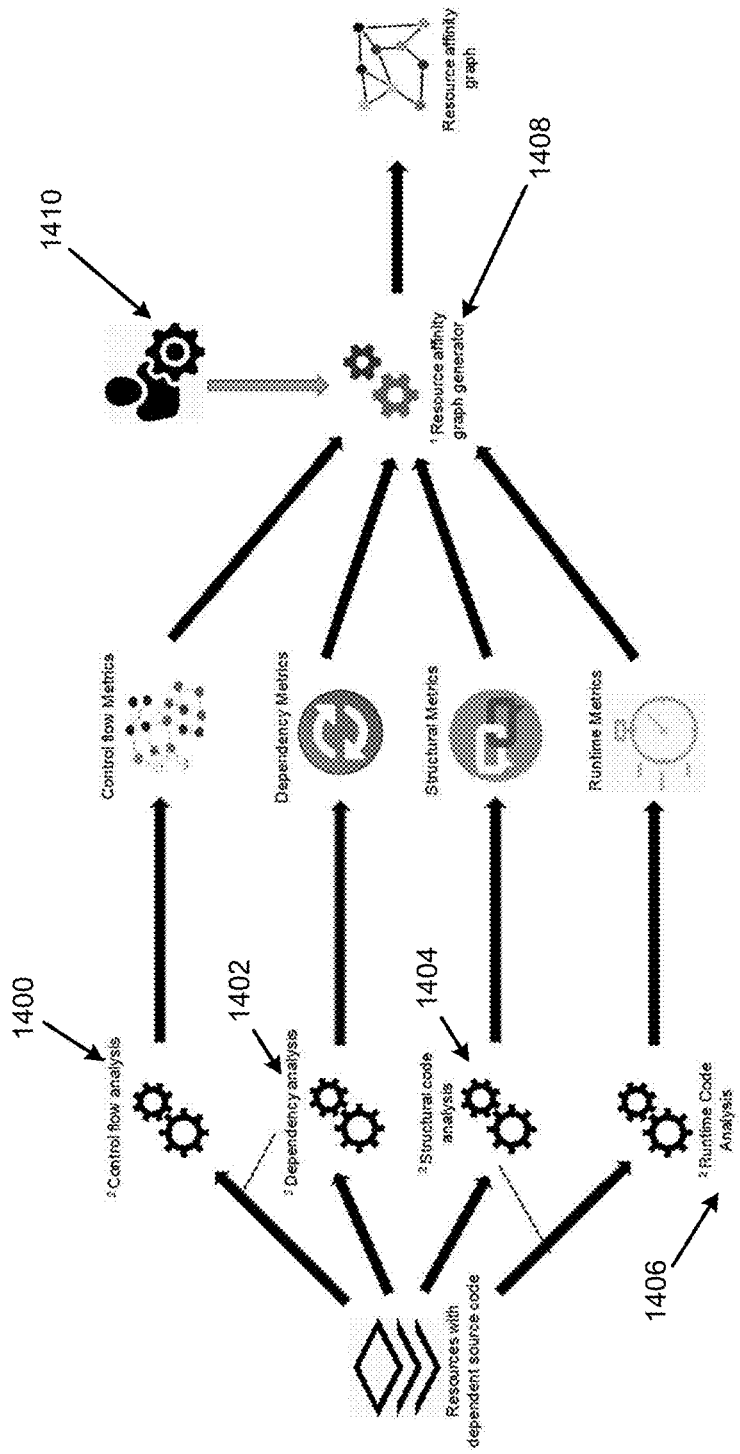
FIG. 14 illustrates details of a resource affinity graph generator of the partitioning based migration of systems to container and microservice based platforms system of FIG. 1, according to an example of the present disclosure.

FIG. 14 illustrates further details of a resource affinity graph generator 120 of the system 100, according to an example of the present disclosure.

Referring to FIG. 14, at 1400, the resource affinity graph generator 120 may extract the control flow dependencies between various resource source code In this regard, static analysis tools may be used to determine the control flow dependencies between the modules. At 1402, the resource affinity graph generator 120 may extract the resource source code dependencies. In this regard, static analysis tools may be used to generate the dependency graph which depicts the extent of dependencies between the modules. At 1404, the resource affinity graph generator 120 may extract the structural dependencies between resources. This information may be derived using structural analysis tools or may be derived using the package explorer application programming interface (API) for the given language. At 1406, the resource affinity graph generator 120 may extract the runtime metrics for the resources 112. In this regard, runtime analysis tools may provide the runtime invocation graph from where the runtime metrices may be derived. These may include runtime invocations of a particular resource by another resource, or any other execution metrics with respect to the resources in the system. At 1408, the resource affinity graph generator 120 may generate the resource affinity graph based on the values derived using the metrics. The aforementioned metrics such as control flow, dependency, runtime and structural between the resources (graph nodes) may form the metrics values placed on the edges of the affinity graph after the pairwise calculations with respect to each aspect, as described earlier. At 1410, the resource affinity graph generator 120 may implement weightages for the various aspects used to derive the resource affinity graph.

FIG. 15 illustrates affinity between modules to illustrate operation of the system 100, according to an example of the present disclosure.

Referring to FIG. 15, with respect to affinity, nodes may represent modules in the application 106 (e.g., node "A", "B", etc.), and edges (e.g., the connection between the nodes) may illustrate affinity of one module to another based on a particular aspect. Each edge may include two labels, denoting affinity of the node one starts traversing to the distant node. As disclosed herein, modules of the application that may denote packages, cohesive resources, domains, context, or a subject matter expert defined scheme. With respect to packages, a package, such as a Java package, may organize classes, such as Java classes, into namespaces, providing a unique namespace for each type the package contains. With respect to resources, a resource may be described as any abstraction of information in REST. For example, any information that may be named may be a resource such as a document or image, a temporal service (e.g., "today's weather in state XYZ"), a collection of other resources, a non-virtual object (e.g., an animal), etc. A resource may also be described as a conceptual mapping to a set of entities.

With respect to affinity, $X_{AB}$ may represent the affinity of A with B (e.g., node "A" with node "B") based on aspect X. For example, A has an affinity of 0.6 with B based on dependencies. For the modules that A is dependent on, the sum of all affinities of A to each of those will be 1. For example, if A is dependent on B, C and D, then $X_{AB}+X_{AC}+X_{AD}=1$.

Figure 16:
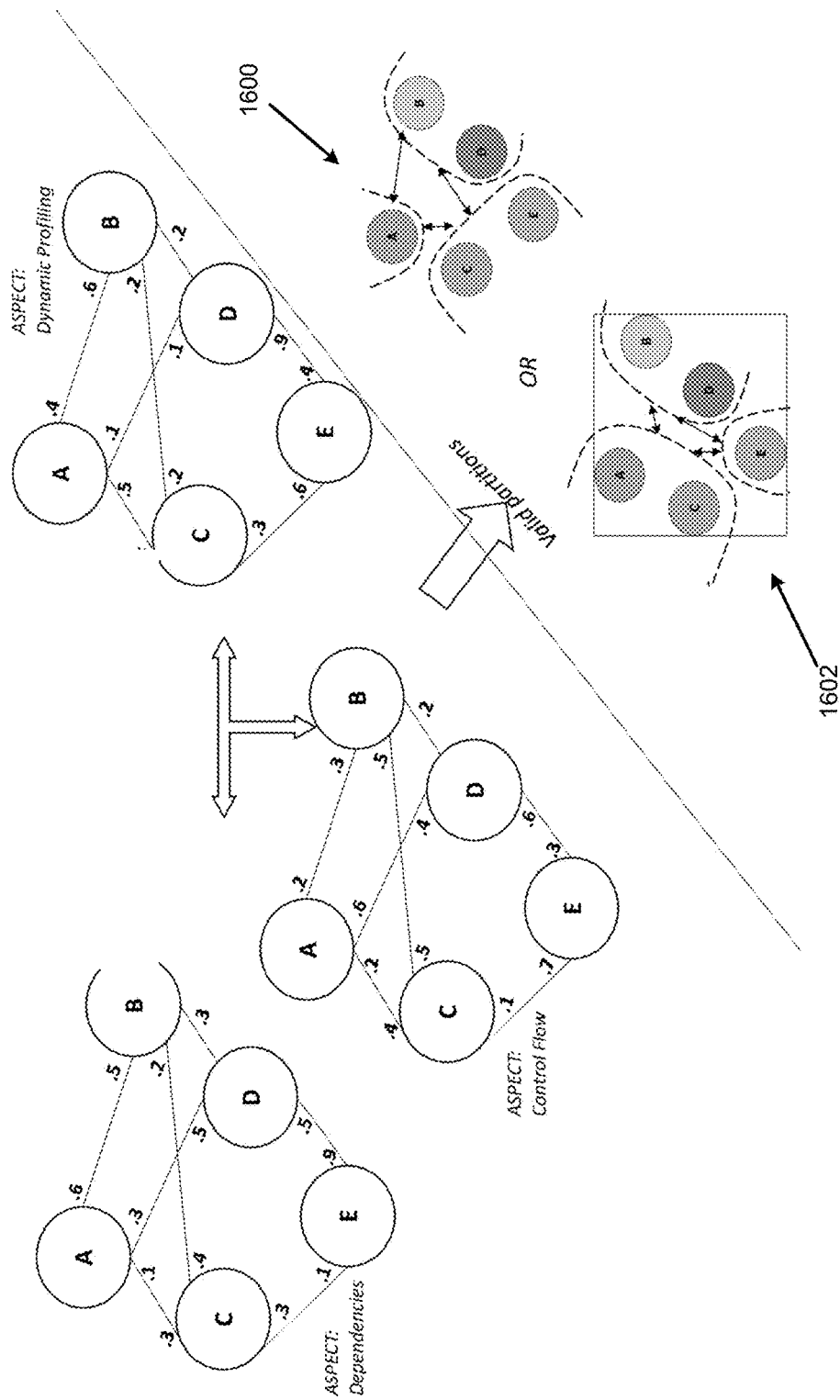
FIG. 16 illustrates determination of valid partitions to illustrate operation of the partitioning based migration of systems to container and microservice based platforms system of FIG. 1, according to an example of the present disclosure.

FIG. 16 illustrates determination of valid partitions to illustrate operation of the system 100, according to an example of the present disclosure.

Referring to FIG. 16, the same application may be represented differently with respect to different aspects considered. Multiple aspects of the same application when overlaid, may provide for analysis of a multi-dimensional optimization problem. For example, the different aspects of "dependencies", "control flow", and "dynamic profiling" of the same application when overlaid, may provide for analysis of a multi-dimensional optimization problem. In this regard, valid partitions of the application 106 are illustrated at 1600 and 1602. In partition 1600, modules C and E may be grouped, modules B and D may be grouped, and module A may remain by itself. In partition 1602, modules A and C may be grouped, modules B and D may be grouped, and module E may remain by itself. With respect to the aforementioned partitions, clusters may be identified in the resource affinity graph, and the identified clusters may denote the proposed partitions.

Figure 17:
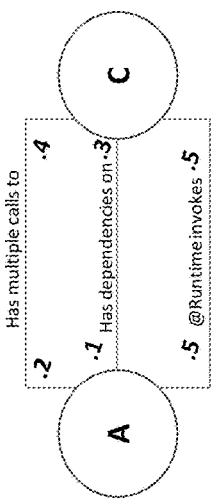
FIG. 17 illustrates equal weightage based analysis to illustrate operation of the partitioning based migration of systems to container and microservice based platforms system of FIG. 1, according to an example of the present disclosure.
Figure 17:
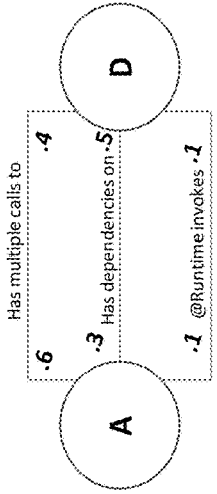
Figure 17:
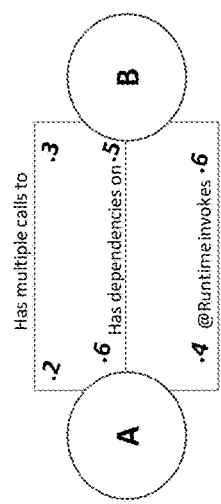

FIG. 17 illustrates equal weightage based analysis to illustrate operation of the system 100, according to an example of the present disclosure.

Referring to FIG. 17, the examples of FIG. 17 illustrate analysis of equal weights applied to control flow, dependencies, and runtime profiling. In this regard, the affinity of A to B may be determined as 0.4, the affinity of A to C may be determined as 0.267, and the affinity of A to D may be determined as 0.333. Accordingly, A may be determined to include the most affinity with B when averaged over three different aspects, resulting in the need to retain A in the same partition as B.

Figure 18:
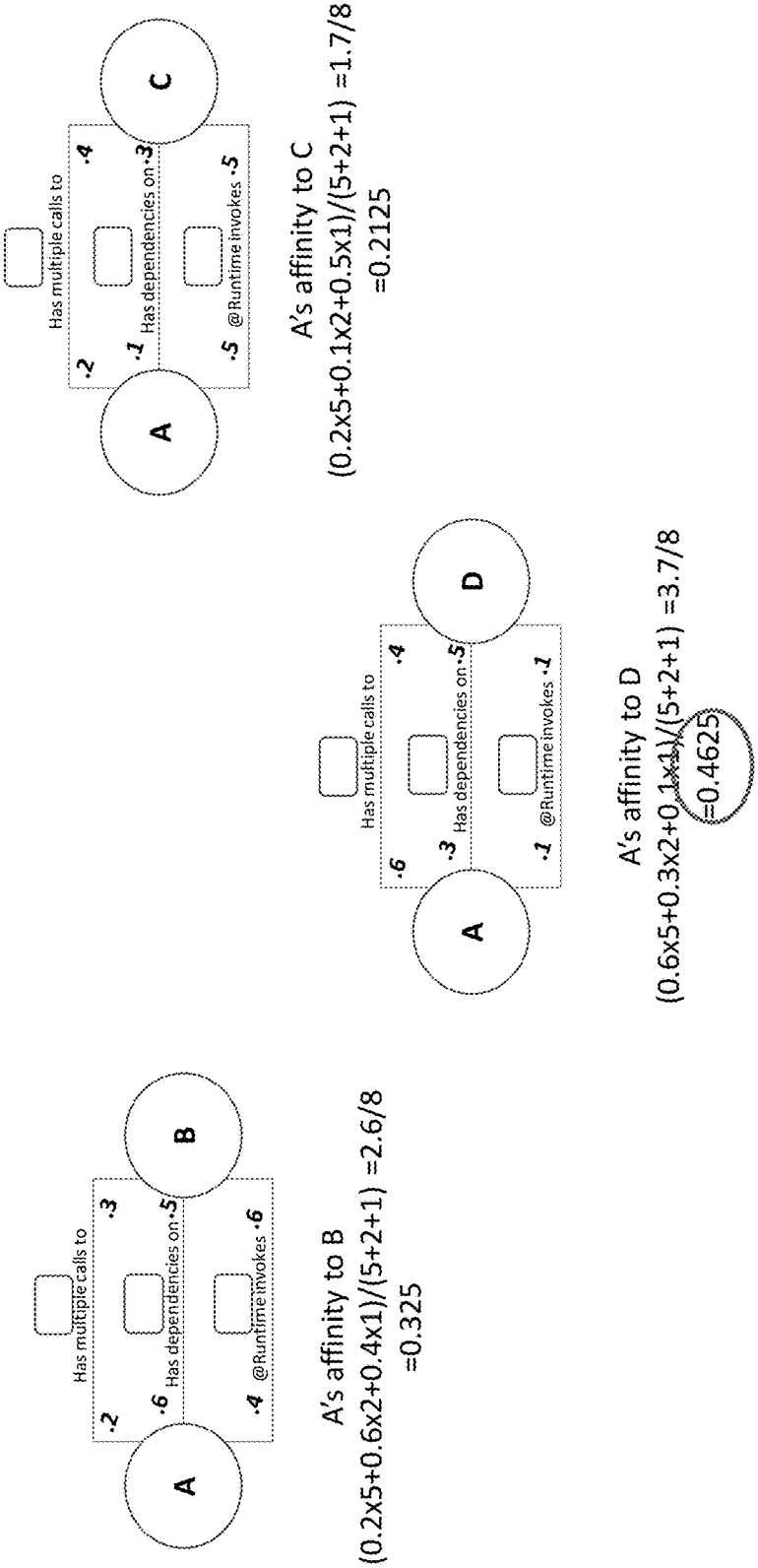
FIG. 18 illustrates different weightage based analysis to illustrate operation of the partitioning based migration of systems to container and microservice based platforms system of FIG. 1, according to an example of the present disclosure.

FIG. 18 illustrates different weightage based analysis to illustrate operation of the system 100, according to an example of the present disclosure.

Referring to FIG. 18, the examples of FIG. 18 illustrate analysis of different weights applied to control flow, dependencies, and runtime profiling. In this example, five times as much weightage may be assigned to control flow compared to runtime invocation information. In this regard, the affinity of A to B may be determined as 0.325, the affinity of A to C may be determined as 0.2125, and the affinity of A to D may be determined as 0.4625. Accordingly, A may be determined to include the most affinity with D when averaged over three different aspects, resulting in the need to retain A in the same partition as D.

Figure 19:
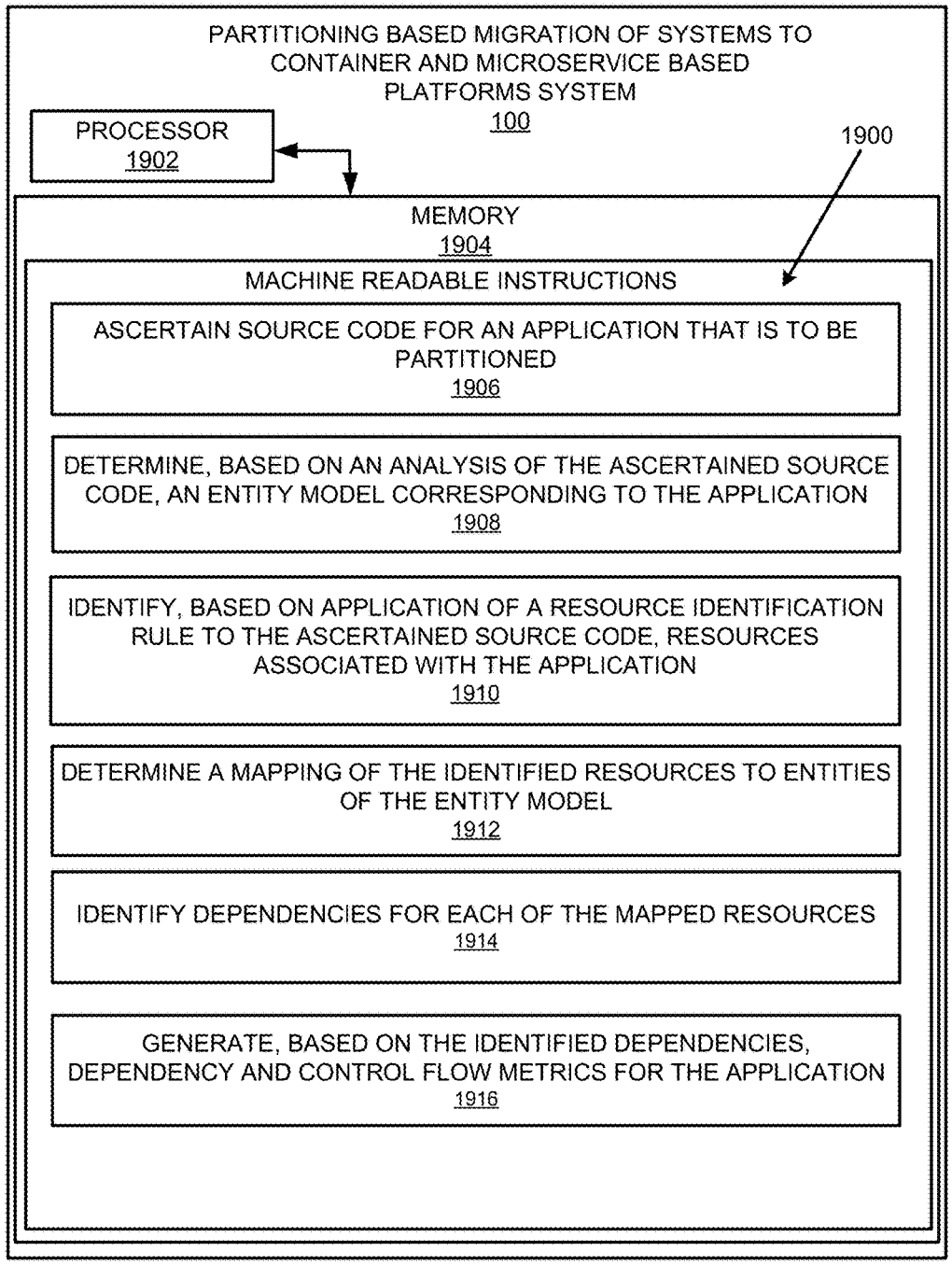
FIG. 19 illustrates a block diagram for partitioning based migration of systems to container and micro-service based-platforms, according to an example of the present disclosure.
Figure 19:
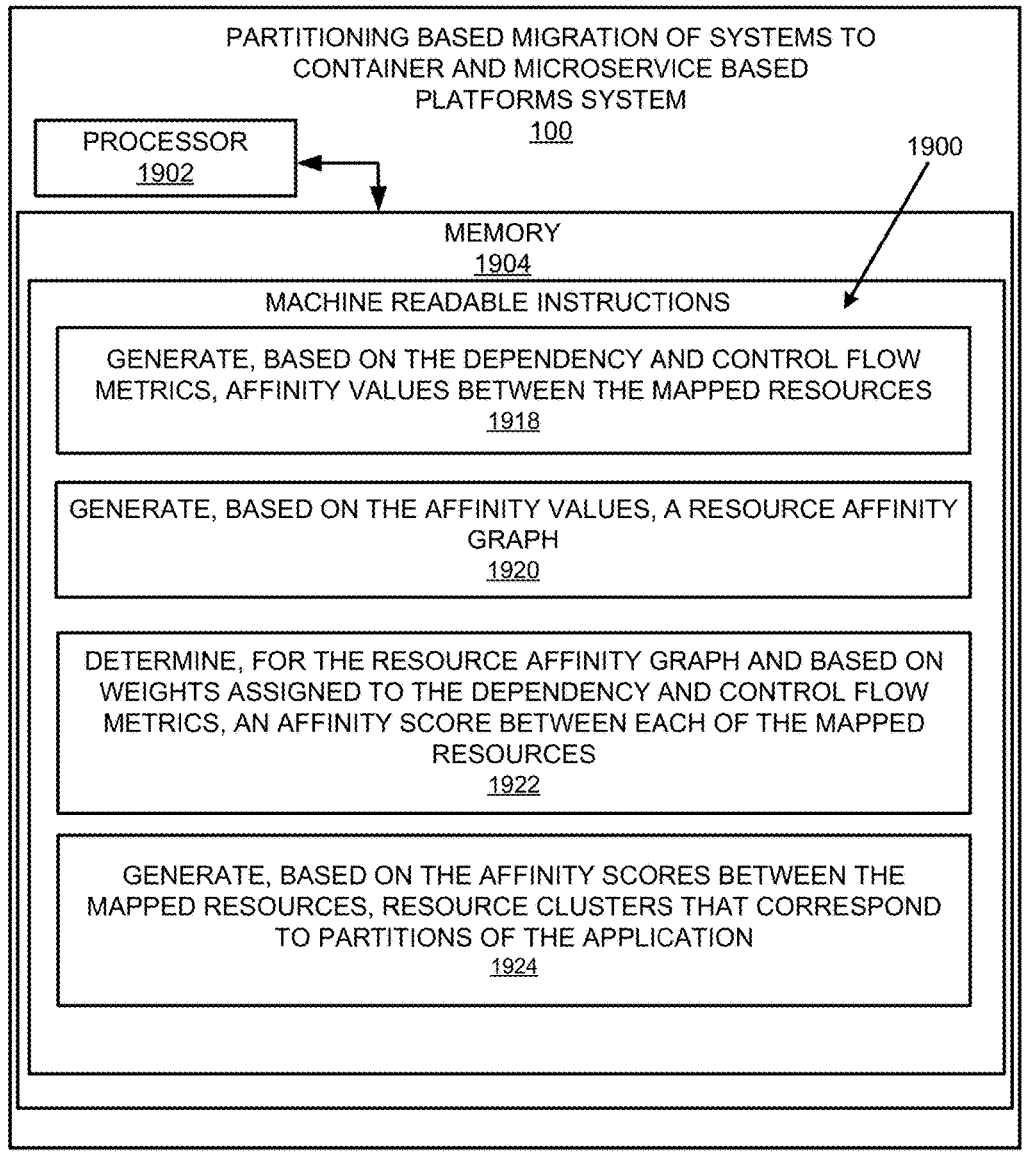
Figure 20:
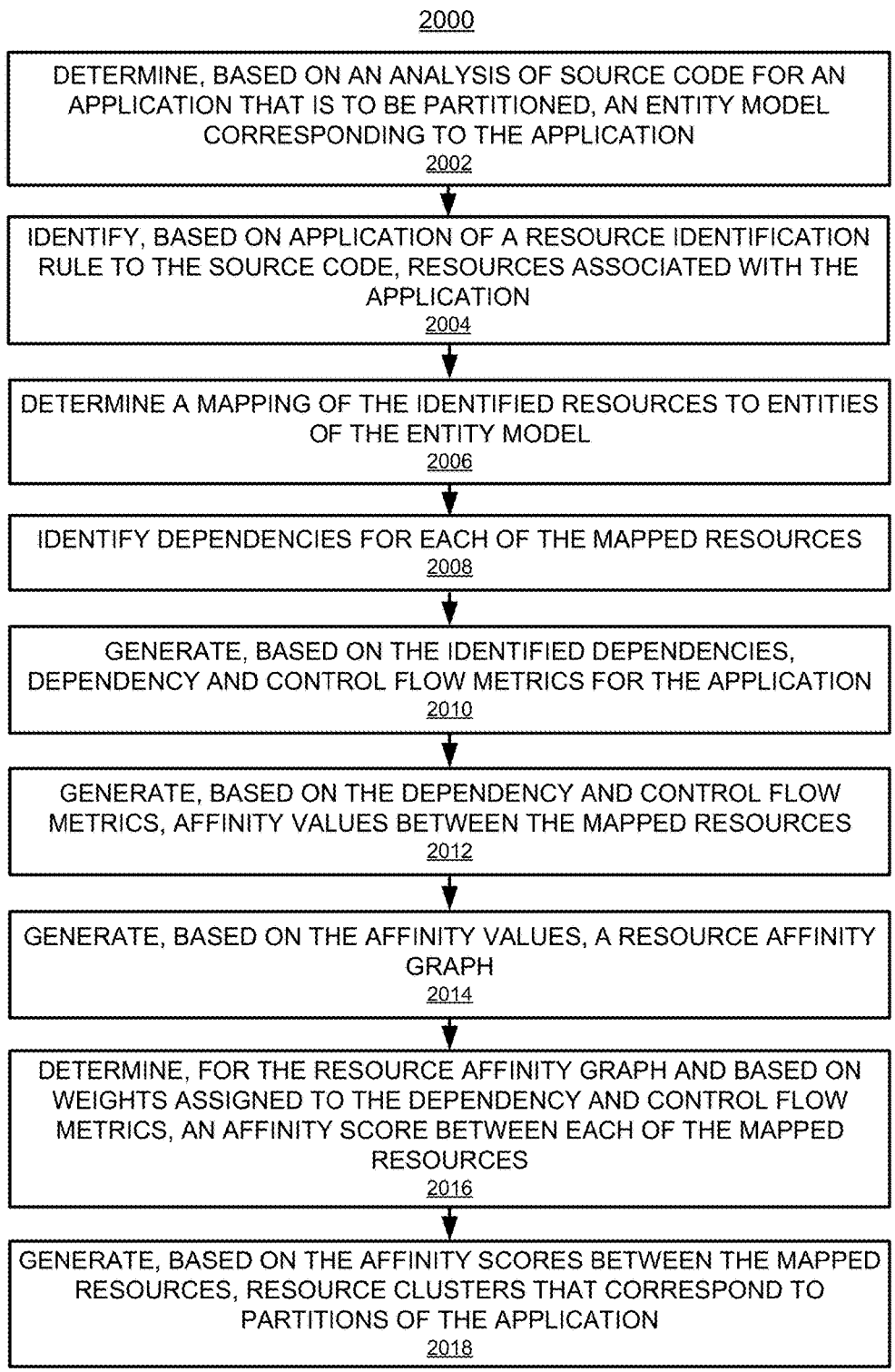
FIG. 20 illustrates a flowchart of a method for partitioning based migration of systems to container and micro-service based-platforms, according to an example of the present disclosure.
Figure 21:
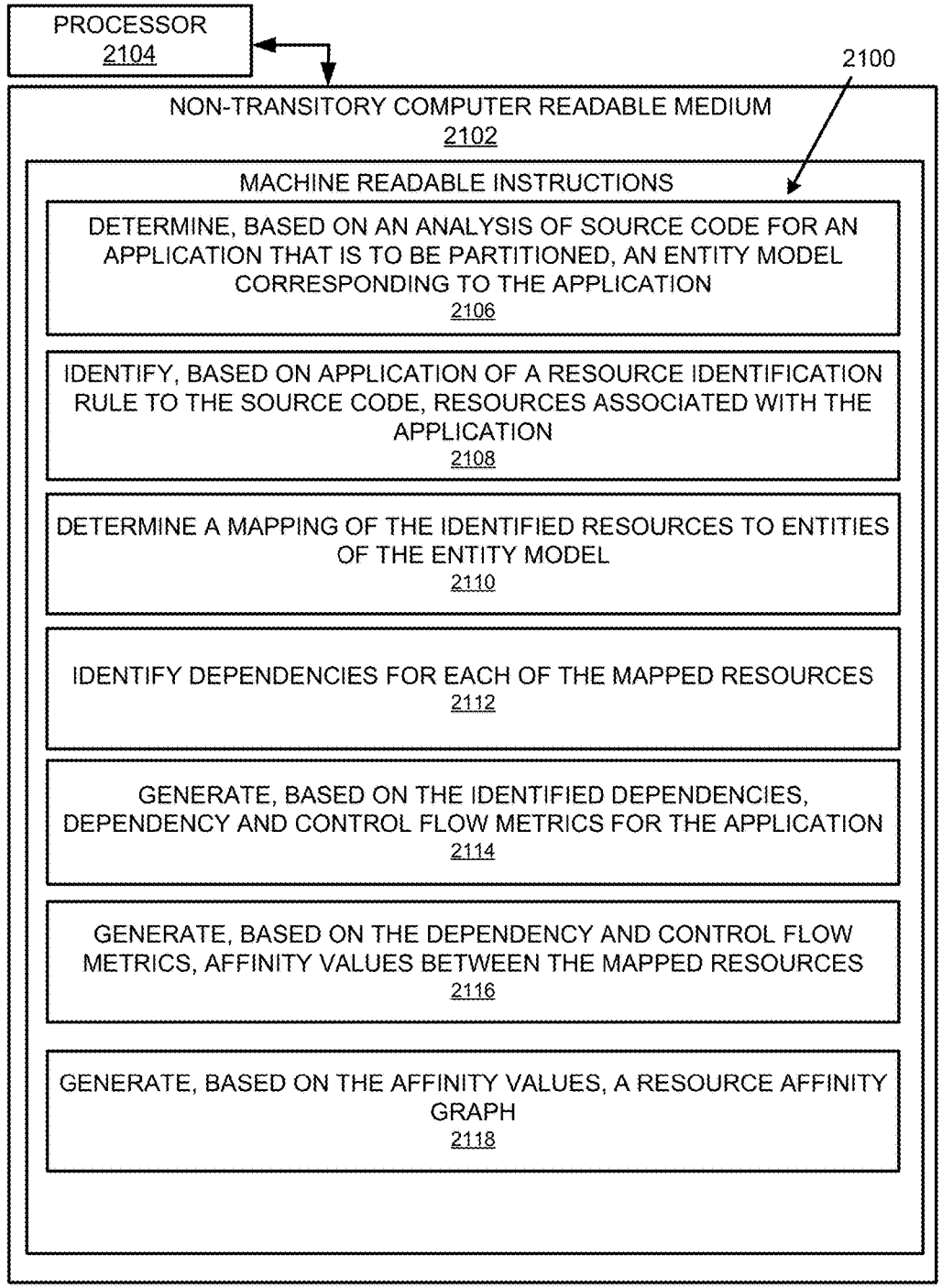
FIG. 21 illustrates a further block diagram for partitioning based migration of systems to container and micro-service based-platforms, according to an example of the present disclosure.
Figure 21:
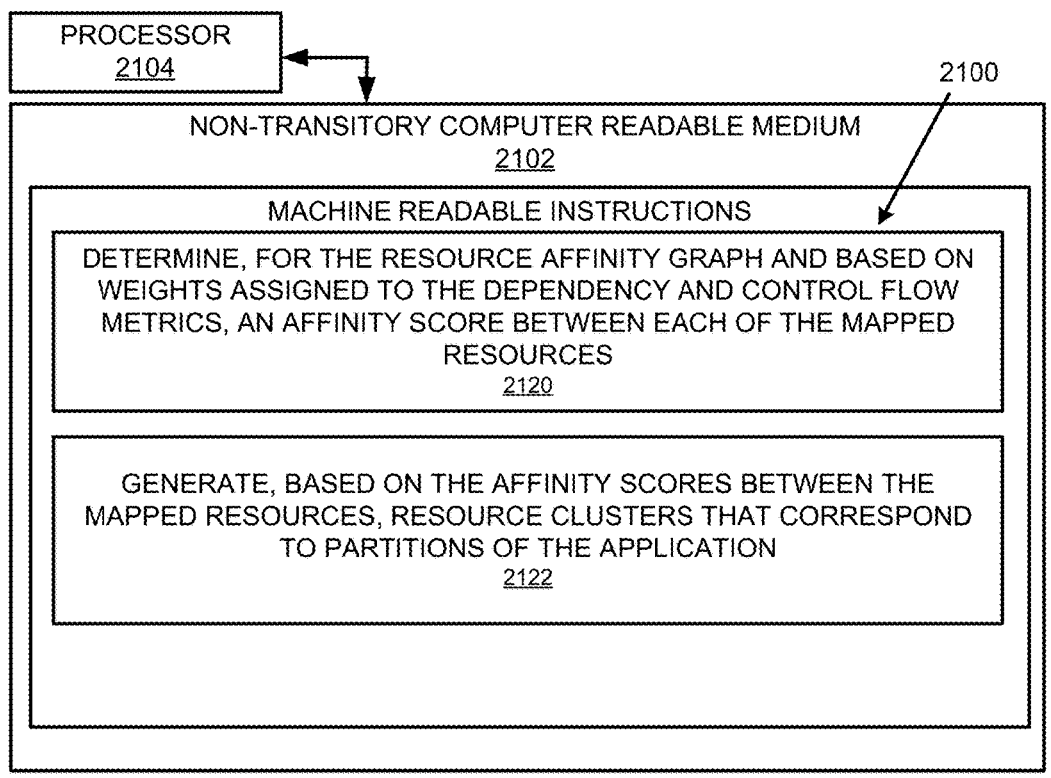

FIGS. 19-21 respectively illustrate a block diagram 1900, a flowchart of a method 2000, and a further block diagram 2100 for partitioning based migration of systems to container and micro-service based-platforms, according to examples. The block diagram 1900, the method 2000, and the block diagram 2100 may be implemented on the system 100 described above with reference to FIG. 1 by way of example and not limitation. The block diagram 1900, the method 2000, and the block diagram 2100 may be practiced in other systems. In addition to showing the block diagram 1900, FIG. 19 shows hardware of the system 100 that may execute the instructions of the block diagram 1900. The hardware may include a processor 1902, and a memory 1904 storing machine readable instructions that when executed by the processor cause the processor to perform the instructions of the block diagram 1900. The memory 1904 may represent a non-transitory computer readable medium. FIG. 20 may represent a method for partitioning based migration of systems to container and micro-service based-platforms, and the steps of the method. FIG. 21 may represent a non-transitory computer readable medium 2102 having stored thereon machine readable instructions to provide partitioning based migration of systems to container and micro-service based-platforms. The machine readable instructions, when executed, cause a processor 2104 to perform the instructions of the block diagram 2100 also shown in FIG. 21.

The processor 1902 of FIG. 19 and/or the processor 2104 of FIG. 21 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2102 of FIG. 21), such as hardware storage devices (e.g., RAM (random access memory), ROM (read only memory), EPROM (erasable, programmable ROM), EEPROM (electrically erasable, programmable ROM), hard drives, and flash memory). The memory 1904 may include a RAM, where the machine readable instructions and data for a processor may reside during runtime.

Referring to FIGS. 1-19, and particularly to the block diagram 1900 shown in FIG. 19, the memory 1904 may include instructions 1906 to ascertain source code 104 for an application 106 that is to be partitioned.

The processor 1902 may fetch, decode, and execute the instructions 1908 to determine, based on an analysis of the ascertained source code 104, an entity model 108 corresponding to the application 106.

The processor 1902 may fetch, decode, and execute the instructions 1910 to identify, based on application of a resource identification rule to the ascertained source code 104, resources 112 associated with the application 106.

The processor 1902 may fetch, decode, and execute the instructions 1912 to determine a mapping of the identified resources 112 to entities of the entity model 108.

The processor 1902 may fetch, decode, and execute the instructions 1914 to identify dependencies 116 for each of the mapped resources 112.

The processor 1902 may fetch, decode, and execute the instructions 1916 to generate, based on the identified dependencies 116, dependency and control flow metrics for the application 106.

The processor 1902 may fetch, decode, and execute the instructions 1918 to generate, based on the dependency and control flow metrics, affinity values 122 between the mapped resources 112.

The processor 1902 may fetch, decode, and execute the instructions 1920 to generate, based on the affinity values 122, a resource affinity graph 124.

The processor 1902 may fetch, decode, and execute the instructions 1922 to determine, for the resource affinity graph 124 and based on weights assigned to the dependency and control flow metrics, an affinity score between each of the mapped resources 112.

The processor 1902 may fetch, decode, and execute the instructions 1924 to generate, based on the affinity scores between the mapped resources 112, resource clusters 128 that correspond to partitions of the application 106.

Referring to FIGS. 1-18 and 20, and particularly FIG. 20, for the method 2000, at block 2002, the method may include determining, based on an analysis of source code 104 for an application 106 that is to be partitioned, an entity model 108 corresponding to the application 106.

At block 2004, the method may include identifying, based on application of a resource identification rule to the source code 104, resources 112 associated with the application 106.

At block 2006, the method may include determining a mapping of the identified resources 112 to entities of the entity model 108.

At block 2008, the method may include identifying dependencies 116 for each of the mapped resources 112.

At block 2010, the method may include generating, based on the identified dependencies 116, dependency and control flow metrics for the application 106.

At block 2012, the method may include generating, based on the dependency and control flow metrics, affinity values 122 between the mapped resources 112.

At block 2014, the method may include generating, based on the affinity values 122, a resource affinity graph 124.

At block 2016, the method may include determining, for the resource affinity graph 124 and based on weights assigned to the dependency and control flow metrics, an affinity score between each of the mapped resources 112.

At block 2018, the method may include generating, based on the affinity scores between the mapped resources 112, resource clusters 128 that correspond to partitions of the application 106.

Referring to FIGS. 1-18 and 21, and particularly FIG. 21, for the block diagram 2100, the non-transitory computer readable medium 2102 may include instructions 2106 to determine, based on an analysis of source code 104 for an application 106 that is to be partitioned, an entity model 108 corresponding to the application 106.

The processor 2104 may fetch, decode, and execute the instructions 2108 to identify, based on application of a resource identification rule to the source code 104, resources 112 associated with the application 106.

The processor 2104 may fetch, decode, and execute the instructions 2110 to determine a mapping of the identified resources 112 to entities of the entity model 108.

The processor 2104 may fetch, decode, and execute the instructions 2112 to identify dependencies 116 for each of the mapped resources 112.

The processor 2104 may fetch, decode, and execute the instructions 2114 to generate, based on the identified dependencies 116, dependency and control flow metrics for the application 106.

The processor 2104 may fetch, decode, and execute the instructions 2116 to generate, based on the dependency and control flow metrics, affinity values 122 between the mapped resources 112.

The processor 2104 may fetch, decode, and execute the instructions 2118 to generate, based on the affinity values 122, a resource affinity graph 124.

The processor 2104 may fetch, decode, and execute the instructions 2120 to determine, for the resource affinity graph 124 and based on weights assigned to the dependency and control flow metrics, an affinity score between each of the mapped resources 112.

The processor 2104 may fetch, decode, and execute the instructions 2122 to generate, based on the affinity scores between the mapped resources 112, resource clusters 128 that correspond to partitions of the application 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus for partitioning systems comprising:
   at least one hardware processor;
   a resource identifier, executed by the at least one hardware processor, to
      ascertain source code for an application that is to be partitioned,
      determine, based on an analysis of the ascertained source code, an entity model corresponding to the application,
      identify, based on application of a resource identification rule to the ascertained source code, resources associated with the application, and
      determine a mapping of the identified resources to entities of the entity model;
   a resource dependent code identifier, executed by the at least one hardware processor, to
      identify dependencies for each of the mapped resources;
   a structural, static, and control flow analyzer, executed by the at least one hardware processor, to
      generate, based on the identified dependencies, dependency and control flow metrics for the application, and
      assign weights to the dependency and control flow metrics;
   a resource affinity graph generator, executed by the at least one hardware processor, to
      generate, based on the dependency and control flow metrics, affinity values between the mapped resources,
      generate, based on the affinity values, a resource affinity graph of the application, and
      determine, for the resource affinity graph and based on the weights assigned to the dependency and control flow metrics, an affinity score between each of the mapped resources; and
   a cluster identifier, executed by the at least one hardware processor, to
      generate resource clusters according to the affinity scores for partitioning the application.

2. The apparatus according to claim 1, wherein the resource identifier is to identify, based on application of the resource identification rule to the ascertained source code, the resources associated with the application by:
   analyzing, based on application of the resource identification rule to a uniform resource identifier of the ascertained source code, a resource of the resources associated with the application.

3. The apparatus according to claim 2, wherein the resource identifier is to identify, based on application of the resource identification rule to the ascertained source code, the resources associated with the application by:
   removing scheme, authority, and version values associated with the uniform resource identifier of the ascertained source code.

4. The apparatus according to claim 1, wherein the resource dependent code identifier is to identify the dependencies for each of the mapped resources by:
   identifying, based on a structural graph, a dependency graph, and a control flow graph, the dependencies for each of the mapped resources.

5. The apparatus according to claim 1, wherein the resource affinity graph generator is to determine, for the resource affinity graph and based on the weights assigned to the dependency and control flow metrics, the affinity score between each of the mapped resources by:
   determining, for the resource affinity graph and based on equal weights assigned to the dependency and control flow metrics, the affinity score between each of the mapped resources.

6. The apparatus according to claim 1, wherein the resource affinity graph generator is to determine, for the resource affinity graph and based on the weights assigned to the dependency and control flow metrics, the affinity score between each of the mapped resources by:
   determining, for the resource affinity graph and based on different weights assigned to the dependency and control flow metrics, the affinity score between each of the mapped resources.

7. The apparatus according to claim 6, wherein the resource affinity graph generator is to determine, for the resource affinity graph and based on the different weights assigned to the dependency and control flow metrics, the affinity score between each of the mapped resources by:
   determining an average affinity score associated with the dependency and control flow metrics.

8. The apparatus according to claim 1, wherein the cluster identifier is to generate the resource clusters by:
   identifying, based on the determined affinity scores between the mapped resources, a highest affinity score; and
   clustering, based on the identification of the highest affinity score, the mapped resources corresponding to the highest affinity score.

9. The apparatus according to claim 1, wherein the cluster identifier is to generate the resource clusters by:
   ascertaining an affinity score threshold value;
   identifying clusters for which the affinity score is greater than the affinity score threshold value; and
   generating, based on the identified clusters for which the affinity score is greater than the affinity score threshold value, the resource clusters that correspond to partitions of the application.

10. A computer implemented method for partitioning systems, the method comprising:
    determining, by a resource identifier that is executed by at least one hardware processor, based on an analysis of source code for an application that is to be partitioned, an entity model corresponding to the application;
    identifying, by the resource identifier that is executed by the at least one hardware processor, based on application of a resource identification rule to the source code, resources associated with the application;
    determining, by the resource identifier that is executed by the at least one hardware processor, a mapping of the identified resources to entities of the entity model;
    identifying, by a resource dependent code identifier that is executed by the at least one hardware processor, dependencies for each of the mapped resources;
    generating, by a structural, static, and control flow analyzer that is executed by the at least one hardware processor, based on the identified dependencies, dependency and control flow metrics for the application, and assigning weights to the dependency and control flow metrics;
    generating, by a resource affinity graph generator that is executed by the at least one hardware processor, based on the dependency and control flow metrics, affinity values between the mapped resources;
    generating, by the resource affinity graph generator that is executed by the at least one hardware processor, based on the affinity values, a resource affinity graph of the application;
    determining, by the resource affinity graph generator that is executed by the at least one hardware processor, for the resource affinity graph and based on the weights assigned to the dependency and control flow metrics, an affinity score between each of the mapped resources; and
    generating, by a cluster identifier that is executed by the at least one hardware processor, resource clusters according to the affinity scores for partitioning the application.

11. The method according to claim 10, wherein identifying, based on application of the resource identification rule to the ascertained source code, the resources associated with the application further comprises:
    analyzing, based on application of the resource identification rule to a uniform resource identifier of the ascertained source code, a resource of the resources associated with the application.

12. The method according to claim 11, wherein identifying, based on application of the resource identification rule to the ascertained source code, the resources associated with the application further comprises:
    removing scheme, authority, and version values associated with the uniform resource identifier of the ascertained source code.

13. The method according to claim 10, wherein identifying the dependencies for each of the mapped resources further comprises:
    identifying, based on a structural graph, a dependency graph, and a control flow graph, the dependencies for each of the mapped resources.

14. The method according to claim 10, wherein determining, for the resource affinity graph and based on the weights assigned to the dependency and control flow metrics, the affinity score between each of the mapped resources further comprises:
    determining, for the resource affinity graph and based on equal weights assigned to the dependency and control flow metrics, the affinity score between each of the mapped resources.

15. The method according to claim 10, wherein determining, for the resource affinity graph and based on the weights assigned to the dependency and control flow metrics, the affinity score between each of the mapped resources further comprises:
    determining, for the resource affinity graph and based on different weights assigned to the dependency and control flow metrics, the affinity score between each of the mapped resources.

16. The method according to claim 15, wherein determining, for the resource affinity graph and based on the different weights assigned to the dependency and control flow metrics, the affinity score between each of the mapped resources further comprises:
    determining an average affinity score associated with the dependency and control flow metrics.

17. A non-transitory computer readable medium having stored thereon machine readable instructions for partitioning systems, the machine readable instructions, when executed, cause at least one hardware processor to:

determine, based on an analysis of source code for an application that is to be partitioned, an entity model corresponding to the application;

identify, based on application of a resource identification rule to the source code, resources associated with the application;

determine a mapping of the identified resources to entities of the entity model;

identify dependencies for each of the mapped resources;

generate, based on the identified dependencies, dependency and control flow metrics for the application;

assign weights to the dependency and control flow metrics;

generate, based on the dependency and control flow metrics, affinity values between the mapped resources;

generate, based on the affinity values, a resource affinity graph of the application;

determine, for the resource affinity graph and based on weights assigned to the dependency and control flow metrics, an affinity score between each of the mapped resources; and generate resource clusters according to the affinity scores for partitioning the application.

18. The non-transitory computer readable medium according to claim 17, wherein the machine readable instructions to generate the resource clusters when executed by the at least one hardware processor, further cause the at least one hardware processor to:

identify, based on the determined affinity scores between the mapped resources, a highest affinity score; and cluster, based on the identification of the highest affinity score, the mapped resources corresponding to the highest affinity score.

19. The non-transitory computer readable medium according to claim 17, wherein the machine readable instructions to generate the resource clusters, when executed by the at least one hardware processor, further cause the at least one hardware processor to:

ascertain an affinity score threshold value;

identify clusters for which the affinity score is greater than the affinity score threshold value; and generate, based on the identified clusters for which the affinity score is greater than the affinity score threshold value, the resource clusters that correspond to partitions of the application.

20. The non-transitory computer readable medium according to claim 17, wherein the machine readable instructions to identify the resources associated with the application, when executed by the at least one hardware processor, further cause the at least one hardware processor to:

analyze, based on application of the resource identification rule to a uniform resource identifier of the ascertained source code, a resource of the resources associated with the application.

\* \* \* \* \*

UNITED STATES PATENT AND TRADEMARK OFFICE
CERTIFICATE OF CORRECTION

PATENT NO. : 10,198,250 B1
APPLICATION NO. : 15/862471
DATED : February 5, 2019
INVENTOR(S) : Vibhu Saujanya Sharma et al.

Page 1 of 1

It is certified that error appears in the above-identified patent and that said Letters Patent is hereby corrected as shown below:

On the Title Page

At Item (72), 1st Inventor's name "Vibhu SHARMA" should be "Vibhu Saujanya SHARMA".

Signed and Sealed this
Twelfth Day of January, 2021

Andrei Iancu
*Director of the United States Patent and Trademark Office*